US010239983B2

United States Patent
Ueda et al.

(10) Patent No.: US 10,239,983 B2
(45) Date of Patent: Mar. 26, 2019

(54) METHOD FOR PRODUCTION OF CONJUGATED DIENE RUBBER

(71) Applicant: ZEON CORPORATION, Tokyo (JP)

(72) Inventors: Eijun Ueda, Tokyo (JP); Takashi Iizuka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 149 days.

(21) Appl. No.: 15/300,332

(22) PCT Filed: Mar. 27, 2015

(86) PCT No.: PCT/JP2015/059591
§ 371 (c)(1),
(2) Date: Sep. 29, 2016

(87) PCT Pub. No.: WO2015/152039
PCT Pub. Date: Oct. 8, 2015

(65) Prior Publication Data
US 2017/0158797 A1    Jun. 8, 2017

(30) Foreign Application Priority Data
Mar. 31, 2014    (JP) .................. 2014-074946

(51) Int. Cl.
*C08F 230/08* (2006.01)
*C08F 297/04* (2006.01)
*C08F 297/02* (2006.01)
*C08L 53/02* (2006.01)
*C08K 3/36* (2006.01)
*B60C 1/00* (2006.01)
*C08F 36/06* (2006.01)
*C08C 19/25* (2006.01)
*C08C 19/44* (2006.01)

(52) U.S. Cl.
CPC .............. *C08F 297/04* (2013.01); *B60C 1/00* (2013.01); *B60C 1/0008* (2013.01); *B60C 1/0016* (2013.01); *B60C 1/0025* (2013.01); *B60C 1/0041* (2013.01); *C08C 19/25* (2013.01); *C08C 19/44* (2013.01); *C08F 36/06* (2013.01); *C08F 297/02* (2013.01); *C08K 3/36* (2013.01); *C08L 53/02* (2013.01); *B60C 2001/005* (2013.01); *C08F 230/08* (2013.01)

(58) Field of Classification Search
CPC ..... C08F 297/04; C08F 297/02; C08F 230/08
See application file for complete search history.

(56) References Cited

U.S. PATENT DOCUMENTS

| 6,627,721 B1 * | 9/2003 | Rodewald ............. C08F 236/14 524/547 |
| 6,838,538 B2 * | 1/2005 | Toyoizumi .............. C08C 19/02 526/336 |
| 2003/0100683 A1 * | 5/2003 | Toyoizumi .............. C08C 19/02 525/331.9 |

FOREIGN PATENT DOCUMENTS

JP    2011-132411 A    7/2011

OTHER PUBLICATIONS

Nov. 8, 2017 Search Report issued in European Patent Application No. 15772697.7.
Jun. 9, 2015 Search Report issued in International Patent Application No. PC/JP2015/059591.

* cited by examiner

*Primary Examiner* — Margaret G Moore
(74) *Attorney, Agent, or Firm* — Oliff PLC

(57) ABSTRACT

A method of production of conjugated diene rubber including a first step of polymerizing a compound represented by a following formula (1) by using a polymerization initiator to obtain a polymer block of the compound represented by the formula (1) having an active end, and a second step of polymerizing a monomer containing at least a conjugated diene compound by using the active end of the polymer block, wherein, in the formula (1), $R^1$ is a hydrogen atom or a hydrocarbon group having 1 to 20 carbon atoms, $R^2$ is a hydrocarbon group having 3 to 20 carbon atoms and containing a ring structure, each of $R^3$ and $R^4$ independently is a hydrogen atom or a hydrocarbon group having 1 to 20 carbon atoms which is substituted or unsubstituted, and X is arbitrary monovalent group.

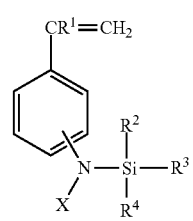

(1)

10 Claims, No Drawings

METHOD FOR PRODUCTION OF CONJUGATED DIENE RUBBER

TECHNICAL FIELD

The present invention relates to a method of production of a conjugated diene rubber, more particularly relates to a method of production of a conjugated diene rubber which is able to give a cross-linked rubber excellent in low heat buildup and suitably used as a material for forming a tire etc. and which is excellent in processability.

BACKGROUND ART

In recent years, fuel efficiency has been strongly sought from automobile tires due to environmental issues and resource issues. A tire obtained by using a rubber composition containing silica is better in low heat buildup compared with a tire obtained by using the usually used rubber composition including carbon black, so it is possible to produce a tire excellent in fuel efficiency using this.

For example, Patent Document 1 discloses a tire-use rubber composition comprising a conjugated diene polymer obtained by copolymerization of a conjugated diene compound etc. with a vinyl compound having a predetermined heteroatom-containing functional group into which silica and a silane coupling agent are added. However, in the art specifically described in Patent Document 1, a vinyl compound having a predetermined heteroatom-containing functional group is copolymerized with so as to improve the affinity of the conjugated diene polymer with silica, but the effect of improvement of the affinity with silica obtained by introduction of the vinyl compound having a predetermined heteroatom-containing functional group is limited. For this reason, in this art, the performance expected to be improved by improvement of the affinity with silica, specifically the low heat buildup, is not necessarily sufficient.

RELATED ART

Patent Documents

Patent Document 1: Japanese Patent Publication No. 2011-132411A

SUMMARY OF THE INVENTION

Problem to be Solved by the Invention

The present invention was made in consideration of this situation and has as its object the provision of a method of production of a conjugated diene rubber which can give a cross-linked rubber excellent in low heat buildup and further which is excellent in processability.

The inventors engaged in intensive research for achieving the above object and as a result obtained the discovery that by polymerizing an aromatic vinyl compound having an amino group protected by a protecting group by using a polymerization initiator, a polymer block, which has an active end, of an aromatic vinyl compound having an amino group protected by a protecting group is obtained and by polymerizing a monomer containing at least a conjugated diene compound by using the active end of the polymer block, a conjugated diene rubber able to give cross-linked rubber excellent in low heat buildup is obtained. Further, the inventors engaged in further intensive research and as a result obtained the discovery that a processability of the conjugated diene rubber obtained by such a method varies greatly depending on a type of a group used as a protecting group for an amino group, and when using, as the protecting group, a silyl group having a cyclic hydrocarbon group as substituent, a conjugated diene rubber which is excellent in processability compared with the case that other protecting groups is used is obtained. The present invention was completed based on these discoveries.

Means for Solving the Problem

Therefore, according to the present invention, there is provided a method of production of a conjugated diene rubber comprising a first step of polymerizing a compound represented by a following formula (1) by using a polymerization initiator to obtain a polymer block of the compound represented by the formula (1) having an active end, and a second step of polymerizing a monomer containing at least a conjugated diene compound by using the active end of the polymer block:

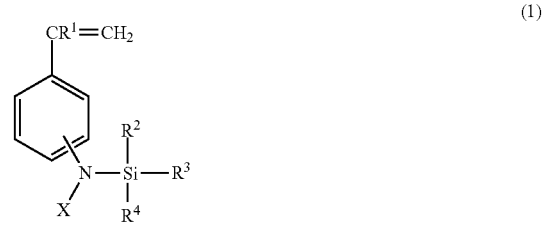
(1)

wherein, in formula (1), $R^1$ is a hydrogen atom or a hydrocarbon group having 1 to 20 carbon atoms, $R^2$ is a hydrocarbon group having 3 to 20 carbon atoms and containing a ring structure, each of $R^3$ and $R^4$ independently is a hydrogen atom or a hydrocarbon group having 1 to 20 carbon atoms which is substituted or unsubstituted, and X is arbitrary monovalent group.

In the above method of production of a conjugated diene rubber, preferably the compound represented by the formula (1) is a compound represented by a following formula (1'):

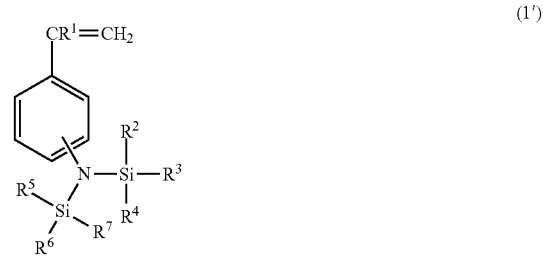
(1')

wherein, in the formula (1'), $R^1$ to $R^4$ are the same as those in formula (1), $R^5$ is a hydrocarbon group having 3 to 20 carbon atoms and containing a ring structure, and each of $R^6$ and $R^7$ independently is a hydrogen atom or a hydrocarbon group having 1 to 20 carbon atoms which is substituted or unsubstituted.

In the above method of production of a conjugated diene rubber, preferably the $R^2$ and $R^5$ are an aryl group-containing hydrocarbon group having 6 to 20 carbon atoms.

The above method of production of a conjugated diene rubber preferably further comprises a third step of reacting an active end of a polymer chain obtained in the second step with a silane compound having a functional group able to react at the active end.

In the above method of production of a conjugated diene rubber, as the monomer, preferably a monomer containing 0 to 50 wt % of an aromatic vinyl compound is used.

In the above method of production of a conjugated diene rubber, preferably the polymer block has a weight average molecule weight (Mw) of 400 to 60,000.

Further, according to the present invention, there is provided a conjugated diene rubber obtained by the above method of production.

Further, according to the present invention, there is provided a rubber composition comprising 100 parts by weight of rubber ingredient containing the conjugated diene rubber according to claim 7 and 10 to 200 parts by weight of silica.

The above rubber composition preferably further comprises a cross-linking agent.

Further, according to the present invention, there is provided a cross-linked rubber obtained by cross-linking the above rubber composition.

Further, according to the present invention, there is provided a tire including the above cross-linked rubber.

Effects of Invention

According to the present invention, it is possible to produce a conjugated diene rubber which can give cross-linked rubber excellent in low heat buildup and which is excellent in processability.

DESCRIPTION OF EMBODIMENTS

[Method of Production of Conjugated Diene Rubber]

The method of production of conjugated diene rubber of the present invention includes a first step of polymerizing a later explained compound represented by a formula (1) by using a polymerization initiator to obtain a polymer block of the compound represented by the formula (1) having an active end, and a second step of polymerizing a monomer containing at least a conjugated diene compound by using the active end of the polymer block.

[First Step]

First, the first step in the method of production of the present invention will be explained. The first step in the method of production of the present invention is a step of polymerizing a compound represented by a following formula (1) by using a polymerization initiator to obtain a polymer block of the compound represented by the formula (1) having an active end. Note that, the polymer block of the compound represented by the formula (1) obtained at the first step acts as a segment showing high affinity with a filler such as silica in the conjugated diene rubber obtained by the method of production of the present invention and due to this, according to the present invention, the affinity with a filler such as silica can be improved.

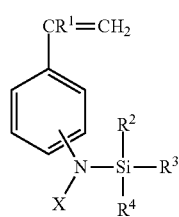

(1)

wherein, in formula (1), $R^1$ is a hydrogen atom or a hydrocarbon group having 1 to 20 carbon atoms, preferably a hydrogen atom or methyl group, more preferably a hydrogen atom.

Further, in formula (1), $R^2$ is a hydrocarbon group having 3 to 20 carbon atoms and containing a ring structure. The ring structure in the hydrocarbon group having 3 to 20 carbon atoms and containing a ring structure represented by $R^2$ may be any of an aromatic ring structure and alicyclic structure, but from the viewpoint of facilitating synthesis of the compound represented by the formula (1), an aromatic ring structure is preferable. Among these, a benzene ring structure is preferable. Further, the hydrocarbon group having 3 to 20 carbon atoms and containing a ring structure represented by $R^2$ may be one comprised of only a cyclic hydrocarbon group or may be a hydrocarbon group comprised of a combination of a ring structure and a chain structure. As specific examples of the hydrocarbon group having 3 to 20 carbon atoms and containing a ring structure, an aryl group-containing hydrocarbon group having 6 to 20 carbon atoms such as a phenyl group, benzyl group, 3-phenylpropyl group, pentalene group, azulenyl group, heptalenyl group, 1-naphthyl group, 2-naphthyl group, tolyl group, trityl group, styryl group, naphthalenyl group, anthracenyl group, phenanthryl group, phenalenyl group, pyrene group, chrysene group, triphenylene group, tetraphene group, tetracene group, pentacene group, and pentaphene group and a cycloalkyl group-containing hydrocarbon group having 3 to 20 carbon atoms such as a cyclopropyl group, cyclobutyl group, cyclopentyl group, cyclohexyl group, cycloheptyl group, 2-cyclohexylethyl group, 2-ethylcyclohexyl group, cyclohexenyl group, and adamantyl group may be mentioned. Among these as well, an aryl group-containing hydrocarbon group having 6 to 20 carbon atoms is preferably used, while a phenyl group is particularly preferably used.

Further, in the formula (1), each of $R^3$ and $R^4$ independently represent a hydrogen atom or a hydrocarbon group having 1 to 20 carbon atoms which is substituted or unsubstituted, preferably an alkyl group having 1 to 20 carbon atoms or aryl group having 6 to 20 carbon atoms, more preferably an alkyl group having 1 to 6 carbon atoms. If the group represented by $R^3$ and $R^4$ is the hydrocarbon group having 1 to 20 carbon atoms which is substituted or unsubstituted, the hydrocarbon group may contain a ring structure or need not contain a ring structure.

The group represented by "—$SiR^2R^3R^4$" in the formula (1) can be said to be a silyl group having at least one hydrocarbon group having 3 to 20 carbon atoms and containing a ring structure. This group functions as a protecting group of an amino group. That is, the group represented by "—$SiR^2R^3R^4$" in the formula (1) is stripped of protection by an acid or base etc., is substituted by a hydrogen atom, and is formed with a nitrogen-hydrogen bond where a nitrogen atom represented by "N" in the formula (1) and a hydrogen atom are directly bonded.

As specific examples of the group represented by "—$SiR^2R^3R^4$" in the formula (1), a dialkylmonoarylsilyl group such as a dimethylphenylsilyl group, benzyldimethylsilyl group, and dimethyl-3-phenylpropylsilyl group, a monoalkyldiarylsilyl group such as a methyldiphenylsilyl group and tert-butyldiphenylsilyl group, a triarylsilyl group such as a triphenylsilyl group, a trialkylsilyl group containing a cycloalkyl group such as a cyclohexyldimethylsilyl group, dicyclohexylmethylsilyl group, and tricyclohexylsilyl group, etc. may be mentioned. Among these as well, from the viewpoint of facilitating the synthesis of the compound represented by the formula (1), dialkylmonoarylsilyl group is preferable, and dimethylphenylsilyl group is particularly preferable.

Further, in the compound represented by the formula (1), X is arbitrary monovalent group. The monovalent group represented by X may be a group functioning as a protecting group of an amino group or may be a group not functioning as a protecting group of an amino group. When making this monovalent group a group not functioning as a protecting group of an amino group, it is not particularly limited so long as a group which is not stripped of protection by an acid or base, but a group other than a hydrogen atom is preferable. For example, it may be an organic group having 1 to 30 carbon atoms which may contain a heteroatom other than silicon. However, from the viewpoint of making the obtained cross-linked rubber excellent in low heat buildup, the monovalent group represented by X in formula (1) is preferably a protecting group of an amino group. As this protecting group of an amino group, an organic group having 1 to 30 carbon atoms and containing a silicon atom as the atom directly bonding with the nitrogen atom represented in formula (1) is preferable. This organic group may contain a heteroatom other than silicon. Further, as such a protecting group of an amino group, a group represented by the following formula (2) is more preferable.

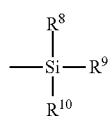

(2)

In formula (2), each of $R^8$ to $R^{10}$ independently represents a hydrogen atom or hydrocarbon group having 1 to 20 carbon atoms which is substituted or unsubstituted.

When making the monovalent group represented by X in formula (1) the protecting group of an amino group, from the viewpoint of making the obtained conjugated diene rubber excellent in processability more, the particularly preferably used group is a silyl group having at least one hydrocarbon group having 3 to 20 carbon atoms and containing a ring structure. That is, the compound represented by the formula (1) is particularly preferably a compound represented by the following formula (1').

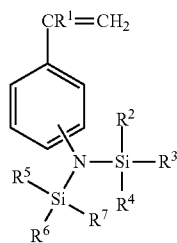

(1')

In formula (1'), $R^1$ to $R^4$ are the same as those in formula (1), $R^5$ is a hydrocarbon group having 3 to 20 carbon atoms and containing a ring structure, while each of $R^6$ and $R^7$ independently indicates a hydrogen atom or hydrocarbon group having 1 to 20 carbon atoms which is substituted or unsubstituted. As specific examples of the hydrocarbon group having 3 to 20 carbon atoms and containing a ring structure represented by $R^5$, groups similar to those mentioned as specific examples of the group represented by $R^2$ in the formula (1) may be mentioned. Further, the preferably used groups are also similar to the groups represented by $R^2$. Furthermore, the groups able to be used as the hydrogen atom or a hydrocarbon group having 1 to 20 carbon atoms which is substituted or unsubstituted represented by $R^6$ and $R^7$ are also similar to the groups represented by $R^3$ and $R^4$.

As specific examples of the group represented by "—$SiR^5R^6R^7$" in the formula (1'), groups the same as those mentioned as specific examples of the group represented by "—$SiR^2R^3R^4$" in the formula (1) may be mentioned. The same is true for the preferably used groups.

Further, in the formula (1), the position of introduction of "—$N(SiR^2R^3R^4)X$" may be any of the p-position, m-position, or o-position of the group represented by —$CR^1$=$CH_2$, but from the viewpoint of better raising the affinity of the obtained conjugated diene rubber with a filler such as silica, the p-position is preferable.

As specific examples of the compound represented by the formula (1) used for forming the polymer block, p-[N,N-bis(dimethylphenylsilyl) amino]styrene, p-[N,N-bis(dimethylphenylsilyl)amino]-α-methylstyrene, etc. may be mentioned, but not limited to these. Note that, the compounds represented by the formula (1) may be used as single types alone or may be used as two types or more combined.

The polymerization initiator used when polymerizing the compound represented by the formula (1) is not particularly limited so long as one able to polymerize the compound represented by the formula (1) so as to give the polymer block of the compound represented by the formula (1) having an active end. As specific examples, an organic alkali metal compound, an organic alkali earth metal compound, and a polymerization initiator having a lanthanum-series metal compound, etc. as a main catalyst are preferably used. As the organic alkali metal compound, for example, organic monolithium compounds such as n-butyllithium, sec-butyllithium, tert-butyllithium, hexyllithium, phenyllithium, and stilbene lithium; organic polyvalent lithium compounds such as dilithiomethane, 1,4-dilithiobutane, 1,4-dilithio-2-ethylcyclohexane, 1,3,5-trilithiobenzene, and 1,3,5-tris(lithiomethyl)benzene; organic sodium compounds such as sodium naphthalene; organic potassium compounds such as potassium naphthalene; etc. may be mentioned. Further, as the organic alkali earth metal compounds, for example, di-n-butylmagnesium, di-n-hexylmagnesium, diethoxycalcium, calcium distearate, di-tert-butoxystrontium, diethoxybarium, diisopropoxybarium, diethylmercaptobarium, di-tert-butoxybarium, diphenoxybarium, diethylaminobarium, barium distearate, diketylbarium, etc. may be mentioned. As the polymerization initiator having a lanthanum-series metal compound as the main catalyst, for example, a polymerization initiator including a salt of a lanthanum-series metal containing a lanthanum-series metal such as lanthanum, cerium, praseodymium, neodymium, samarium, and gadolinium and a carboxylic acid and phosphorus-containing organic acid etc. as a main catalyst and a co-catalyst such as an alkyl aluminum compound, organic aluminum hydride compound, organic aluminum halide compound etc. may be mentioned. Among these polymerization initiators, an organic monolithium compound and organic polyvalent lithium compound are preferable, an organic monolithium compound is more preferable, and n-butyllithium is particularly preferable. Note that, the organic alkali metal compound may be used as an organic alkali metal amide compound by reacting it in advance with a secondary amine such as dibutylamine, dihexylamine, dibenzylamine, pyrrolidine, hexamethyleneimine, and heptamethyleneimine. These polymerization initiators may be used as single types alone or may be used as two types or more combined.

In the first step of the method of production of the present invention, the polymerization reaction of the compound represented by the formula (1) proceeds along with the living property, so the ratio of use of the polymerization initiator and the compound represented by the formula (1) may be determined in accordance with the targeted molecular weight of the polymer block, but the amount of use of the polymerization initiator with respect to 1 mole of the compound represented by the formula (1) is preferably selected in the range of 0.01 to 0.5 mole, more preferably 0.02 to 0.5 mole, particularly preferably 0.05 to 0.5 mole. If the amount of use of the polymerization initiator is too small, the obtained polymer block of the compound represented by the formula (1) end up becoming too high in molecular weight, the conjugated diene rubber becomes higher in viscosity, and the processability is liable to deteriorate. On the other hand, if the amount of use of the polymerization initiator is too great, the obtained polymer block of the compound represented by the formula (1) ends up becoming too low in molecular weight and the effect of improvement of the affinity of the conjugated diene rubber with respect to the filler is liable to become difficult to obtain.

In the method of production of the present invention, the type of polymerization of the compound represented by the formula (1) is preferably solution polymerization.

The solvent used in the solution polymerization method is one usually used in solution polymerization. It is not particularly limited so long as not obstructing the polymerization reaction. As specific examples of the inert solvent, a chain aliphatic hydrocarbon such as butane, pentane, hexane, heptane, and 2-butene; an alicyclic hydrocarbon such as cyclopentane, cyclohexane, and cyclohexene; an aromatic hydrocarbon such as benzene, toluene, and xylene; etc. may be mentioned. Note that, these solvents may be used as single types alone or two types or more mixed together.

The concentration of the compound represented by the formula (1) in the polymerization solution in the solution polymerization method is not particularly limited, but usually is selected in the range of 0.1 to 50 wt %, preferably 0.5 to 45 wt %, more preferably 1 to 40 wt %. If the concentration of the compound represented by the formula (1) in the solution is too low, the productivity of the conjugated diene rubber is liable to deteriorate, while if concentration is too high, the viscosity of the solution sometimes becomes too high and the handling ability becomes difficult. Further, the polymerization temperature is also not particularly limited, but is usually −30° C. to +200° C., preferably 0° C. to +180° C. in range. The polymerization time is also not particularly limited but is usually 1 minute to 100 hours in range. As the polymerization system, any of the batch system, continuous system, etc. may also be employed.

Further, at the time of the polymerization reaction, in order to promote the polymerization reaction, it is possible to add a polar compound to the polymerization reaction system. As the polar compound, an ether compound such as dibutylether, tetrahydrofuran, and 2,2-di(tetrahydrofuryl) propane; a tertiary amine such as tetramethylethylenediamine; an alkali metal alkoxide; a phosphine compound; etc. may be mentioned. Among these as well, an ether compound and tertiary amine are preferable. In particular, from the viewpoint of being able to form a chelate structure with the metal contained in the polymerization initiator, 2,2-di(tetrahydrofuryl)propane and tetramethylethylenediamine are particularly preferable. These polar compounds may be used as single types alone or may be used as two types or more combined. The amount of use of the polar compound is not particularly limited, but is preferably 0.001 to 100 moles with respect to 1 mole of the polymerization initiator, more preferably 0.01 to 10 moles. By making the amount of use of the compound having a coordinating property with the active metal atom the above range, the effect of addition can be made more suitable.

Note that, in the first step of the method of production of the present invention, the weight average molecule weight (Mw) of the polymer block obtained by the above compound represented by the formula (1) is, as a value converted to polystyrene, preferably 400 to 60,000, more preferably 500 to 30,000, still more preferably 700 to 10,000. If the weight average molecule weight (Mw) is too small, the effect of improvement of the affinity of the conjugated diene rubber with silica etc. caused by the introduction of the polymer block of the compound represented by the formula (1) is liable to become difficult to obtain. On the other hand, if the weight average molecule weight (Mw) is too large, the conjugated diene rubber rises in viscosity and the processability is liable to deteriorate.

According to the above first step of the method of production of the present invention, by polymerizing the compound represented by the formula (1), it is possible to obtain the polymer block of the compound represented by the formula (1) having an active end. Note that, in the present invention, the polymer block of the compound represented by the formula (1) having an active end are preferably comprised of only the compound represented by the formula (1), but this does not exclude block to which another compound is copolymerized to an extent not fundamentally detracting from the effect of the present invention.

[Second Step]

Next, the second step in the method of production of the present invention will be explained.

The second step in the method of production of the present invention is a step of polymerizing a monomer containing at least a conjugated diene compound by using the active end of the polymer block of the compound represented by the formula (1) having an active end obtained at the above-mentioned first step. That is, the second step of the method of production of the present invention is a step of polymerizing a monomer containing at least a conjugated diene compound by using the active end of the polymer block of the compound represented by the formula (1) having an active end obtained at the above-mentioned first step as polymerization starting end to obtain a polymer chain containing monomer units derived from a conjugated diene compound forming the conjugated diene rubber.

The conjugated diene compound used for the polymerization is not particularly limited. For example, 1,3-butadiene, isoprene, 2,3-dimethyl-1,3-butadiene, 1,3-pentadiene, 2-methyl-3-ethyl-1,3-butadiene, 2-methyl-1,3-pentadiene, 1,3-hexadiene, 1,3-cyclohexadiene, etc. may be mentioned. Among these as well, 1,3-butadiene, isoprene, and 1,3-pentadiene are preferable, while 1,3-butadiene and isoprene are particularly preferable. Note that, these conjugated diene compounds may be used as single types alone or may be used as two types or more combined.

Further, the conjugated diene rubber produced by the method of production of the present invention may be one obtained by copolymerization of an aromatic vinyl compound in addition to a conjugated diene compound. The aromatic vinyl compound is not particularly limited. For example, styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-tert-butylstyrene, 5-tert-butyl-2-methylstyrene, vinylnaphthalene, dimethylaminomethylstyrene, dimethylaminoethylstyrene, a compound represented by the formula (1), etc. may be mentioned. Among these as well, styrene, α-methylstyrene, or 4-methylstyrene is preferable, while styrene is particularly preferable. Note that, these aromatic vinyl compounds may be used as single types alone or may be used as two types or more combined.

The monomer polymerized at the second step preferably contains 0 to 50 wt % of the aromatic vinyl compound, more preferably more than 0 wt % and 50 wt % or less, further preferably 5 to 45 wt %. Further, the monomer polymerized at the second step preferably contains 50 to 100 wt % of the conjugated diene compound, more preferably 50 wt % or more and less than 100 wt %, further preferably 55 to 95 wt %. In other words, in the polymer chain containing the conjugated diene compound of the conjugated diene rubber produced by the method of production of the present invention (that is, the parts excluding the polymer block of the compound represented by the formula (1)), the ratios of the monomer units derived from the conjugated diene compound (conjugated diene monomer units) and the monomer units derived from the aromatic vinyl compound (aromatic vinyl monomer units) are conjugated diene monomer units of preferably 50 to 100 wt %, more preferably 50 wt % or more and less than 100 wt %, more preferably 55 to 95 wt %, and, further, aromatic vinyl monomer units of preferably 0 to 50 wt %, more preferably more than 0 wt % and 50 wt % or less, still more preferably 5 to 45 wt %. According to the method of production of the present invention, by using as the monomer polymerized at the second step an aromatic vinyl compound in addition to the conjugated diene compound and thereby making the conjugated diene rubber produced by the method of production of the present invention one containing aromatic vinyl monomer units, it is possible to make the obtained cross-linked rubber one excellent in not only low heat buildup, but also wet grip.

Further, at the second step of the method of production of the present invention, it is also possible to copolymerize, as desired, in addition to the conjugated diene compound and aromatic vinyl compound, another compound able to copolymerize with these in a range not detracting from the object of the present invention. As the other copolymerizable compound, for example, an α,β-unsaturated nitrile such as acrylonitrile and methacrylonitrile; an unsaturated carboxylic acid or acid anhydride such as acrylic acid, methacrylic acid, and maleate anhydride; an unsaturated carboxylic acid ester such as methyl methacrylate, ethyl acrylate, and butyl acrylate; a nonconjugated diene such as 1,5-hexadiene, 1,6-heptadiene, 1,7-octadiene, dicyclopentadiene, and 5-ethylidene-2-norbornene; etc. may be mentioned. These other copolymerizable compounds are preferably 10 wt % or less as monomer units in the polymer chain containing the conjugated diene compound of the conjugated diene rubber produced by the method of production of the present invention (that is, the parts excluding the polymer block of the compound represented by the formula (1)), more preferably 5 wt % or less.

In the second step of the method of production of the present invention, the type of the copolymerization when using two or more types of monomers to obtain a copolymer is not particularly limited. Any of a random type, block type, or taper type is possible, but a random bonding type is preferable. By making the polymer the random type, the obtained cross-linked rubber becomes particularly excellent in low heat buildup.

In the second step of the method of production of the present invention, the polymerization reaction of the monomer containing the conjugated diene compound proceeds along with a living property, so the ratio of use of the polymer block of the compound represented by the formula (1) having an active end obtained at the above-mentioned first step and the monomer containing the conjugated diene compound may be determined in accordance with the targeted molecular weight of the conjugated diene rubber, but the amount of the polymer block of the compound represented by the formula (1) having an active end (usually substantially the same as the amount of use of the polymerization initiator at the first step) with respect to 1 mole of the monomer containing the conjugated diene compound is selected in the range of preferably 0.05 to 0.8 mmol, more preferably 0.07 to 0.7 mmol, particularly preferably 0.1 to 0.6 mmol. If the amount of the polymer block of the compound represented by the formula (1) having an active end with respect to the amount of use of the monomer is too small, the obtained conjugated diene rubber is liable to become too high in molecular weight and handling becomes difficult and the polymerization reaction is liable to insufficiently proceed. On the other hand, if too great, the obtained conjugated diene rubber becomes too low in molecular weight and is liable to become inferior in characteristics as a rubber material.

In the method of production of the present invention, for the type of polymerization of the monomer containing the conjugated diene compound, the solution polymerization method is preferable.

As the solvent used in the solution polymerization method, one similar to those in the above-mentioned first step may be used. Further, from the viewpoint of control of the polymerization, it is preferable to add the polymer block of the compound represented by the formula (1) having an active end obtained in the above-mentioned first step into the solution in which the monomer containing the conjugated diene compound are dissolved. Note that, the polymer block of the compound represented by the formula (1) having an active end is preferably added in the state of a solution. In this case, it is possible to use the polymerization solution used for polymerization as is.

Further, when performing the polymerization reaction, to adjust the polymerization rate and the microstructure of the conjugated diene rubber obtained, specifically the content of vinyl bonds, it is possible to add the above-mentioned polar compound to the polymerization reaction system. However, when preparing the polymer block of the compound represented by the formula (1) having an active end, if adding to an inert solvent a sufficient amount of polar compound for adjusting the content of vinyl bonds of the conjugated diene rubber, it is possible to not newly add a polar compound. The amount of use of the polar compound may be determined in accordance with the targeted content of vinyl bonds. It is preferably 0.001 to 100 moles, more preferably 0.01 to 10 moles, with respect to 1 mole of the active end of the polymer block of the compound represented by the formula (1) having an active end. If the amount of use of the polar compound is in this range, adjustment of the content of vinyl bonds in the conjugated diene monomer units is easy and no major problem arises due to the deactivation of the active end.

The concentration of monomer containing the conjugated diene compound in the polymerization solution in the polymerization reaction is not particularly limited, but is selected in the range of usually 1 to 50 wt %, preferably 2 to 45 wt %, more preferably 5 to 40 wt %. If the concentration of the monomer containing the conjugated diene compound in the solution is too low, the productivity of the conjugated diene rubber is liable to deteriorate. If the concentration is too high, the viscosity of the solution becomes too high and the handling sometimes becomes difficult. Further, the polymerization temperature is also not particularly limited, but is usually −30° C. to +200° C., preferably 0° C. to +180° C. in range. The polymerization time is also not particularly limited and is usually 1 minute to 100 hours in range. As the polymerization system, any system such as the batch system, continuous system, etc. may be employed, but when making a conjugated diene compound and aromatic vinyl compound copolymerize, the batch system is preferable from the viewpoint that the randomness of the bonds between the conjugated diene monomer units and the aromatic vinyl monomer units becomes easy to control.

According to the second step of the method of production of the present invention, it is possible to polymerize the monomer containing the conjugated diene compound by using the polymer block of the compound represented by the formula (1) having an active end obtained by the above-mentioned first step in the above way so as to obtain conjugated diene rubber.

The weight average molecule weight (Mw) of the conjugated diene rubber obtained at the above-mentioned second step is, in terms of the value measured by gel permeation chromatography and converted to polystyrene, preferably 100,000 to 1,000,000, more preferably 120,000 to 700,000, particularly preferably 150,000 to 500,000. When the weight average molecule weight (Mw) of the conjugated diene rubber is within the above range, the obtained cross-linked rubber becomes excellent in balance of strength and low heat buildup.

Note that, in the conjugated diene rubber obtained at the second step, the content of the units of the compound represented by the formula (1) forming the polymer block of the compound represented by the formula (1) is preferably 0.1 to 10.0 wt % with respect to all monomer units, more preferably 0.4 to 6.0 wt %.

Further, at the second step of the method of production of the present invention, the polymerization reaction of the monomer containing at least the conjugated diene compound proceeds along with a living property, so the polymer chain of the conjugated diene rubber obtained by this method become one having an active end. For this reason, in the method of production of the conjugated diene rubber of the present invention, it is preferable to add a step of deactivating such active end of the polymer chain of the conjugated diene rubber by adding to the polymerization system the compound usually used in the past such as a coupling agent other than a silane compound explained later such as tin tetrachloride, an end modifying agent other than a silane compound explained later such as N-methyl-ε-caprolactam, a polymerization terminator such as methanol, etc.

[Third Step]

Alternatively, for the polymer chain of the conjugated diene rubber having an active end obtained at the second step, it is also possible to not provide a step of deactivating the active end of the polymer chain of the conjugated diene rubber or to deactivate only part of the active end of the polymer chain of the conjugated diene rubber and make the active end of the polymer chain of the conjugated diene rubber react with a silane compound having a functional group able to react with the active end to thereby obtain a conjugated diene rubber modified by a silane compound. That is, in the present invention, it is possible to further provide a third step of making the active end of polymer chain of the conjugated diene rubber obtained at the above-mentioned second step react with a silane compound having a functional group able to react with the active end (below, simply referred to as a "silane compound") so as to obtain a conjugated diene rubber modified by a silane compound. In this case, a conjugated diene rubber having polymer block formed by repeating units represented by the following formula (3) and having a group containing silicon atom at the other end can be obtained.

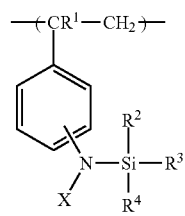

(3)

In formula (3), $R^1$ to $R^4$ and X are the same as those in formula (1).

The functional group able to react with the active end of the polymer chain of the conjugated diene rubber are not particularly limited so long as one able to react with the active end, but from the viewpoint of the reactivity with the active end, functional groups selected from the group consisting of halogen atom, 2-pyrrolidonyl group, vinyl group, alkoxy group, amino group, and epoxy group are preferable, functional groups selected from the group consisting of 2-pyrrolidonyl group, epoxy group, and alkoxy group are more preferable, and epoxy group is particularly preferable.

As the silane compound used in the present invention, for example, polyorganosiloxane, a hydrocarbyloxysilane compound, etc. may be mentioned. The polyorganosiloxane is not particularly limited so long as having a functional group able to react with the active end of the polymer chain of the conjugated diene rubber, but as specific example, a polyorganosiloxane represented by the following formula (4) etc. may be mentioned. Further, the hydrocarbyloxysilane compound is not particularly limited so long as having a functional group able to react with the active end of the polymer chain of the conjugated diene rubber, but as specific examples, a hydrocarbyloxysilane compound represented by the following formula (5); a tetraalkoxysilane compound such as tetramethoxysilane and tetraethoxysilane; a hexaalkoxysilane compound such as bis(trimethoxysilyl)ethane and bis(trimethoxysilyl)hexane; an alkylalkoxysilane compound such as methyltriethoxysilane; a vinylalkoxysilane compound such as vinyltrimethoxysilane; an arylalkoxysilane compound such as phenyltrimethoxysilane; a halogenalkoxysilane compound such as triethoxychlorosilane; an epoxy group-containing alkoxysilane compound such as 3-glycidoxyethyltrimethoxysilane, 3-glycidoxybutylpropyltrimethoxysilane, and bis(3-glycidoxypropyl)dimethoxysilane; a sulfur-containing alkoxysilane compound such as bis(3-(triethoxysilyl)propyl)disulfide; an amino group-containing alkoxysilane compound such as bis(3-trimethoxysilylpropyl)methylamine; an isocyanate group-containing alkoxysilane compound such as tris(3-trimethoxysilylpropyl)isocyanurate; etc. may be mentioned. In addition, as a silane compound used in the present invention, a tetrahalogenated silane such as tetrachlorosilane etc. may be mentioned. Among these as well, a polyorganosiloxane represented by the formula (4) and a hydrocarbyloxysilane compound represented by the formula (5) are preferable. In particular, by using the polyorganosiloxane shown in formula (4), the obtained cross-linked rubber can be made more excellent in low heat buildup.

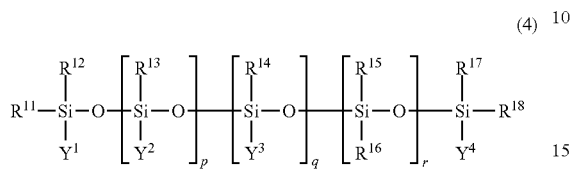

In the formula (4), each of $R^{11}$ to $R^{18}$ independently is an alkyl group having 1 to 6 carbon atoms or an aryl group having 6 to 12 carbon atoms. Each of $Y^1$ and $Y^4$ independently is a functional group able to react with the active end of the polymer chain of the conjugated diene rubber, an alkyl group having 1 to 6 carbon atoms, or aryl group having 6 to 12 carbon atoms. $Y^2$ is a functional group able to react with the active end of the polymer chain of the conjugated diene rubber. The plurality of $Y^2$ may be the same as each other or different. $Y^3$ is a group containing 2 to 20 alkylene glycol repeating units. When there are a plurality of $Y^3$, these may be the same as each other or different. "p" is an integer of 3 to 200, "q" is an integer of 0 to 200, and "r" is an integer of 0 to 200.

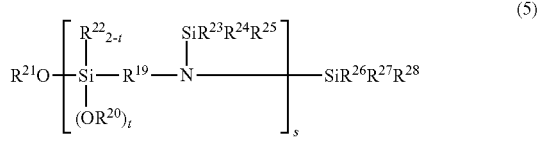

In the formula (5), $R^{19}$ is an alkylene group having 1 to 12 carbon atoms. When there are a plurality of $R^{19}$, these may be the same as each other or different. Each of $R^{20}$ to $R^{28}$ independently is an alkyl group having 1 to 6 carbon atoms or aryl group having 6 to 12 carbon atoms. "s" is an integer of 1 to 10, while "t" is an integer of 0 to 2.

In the polyorganosiloxane represented by formula (4), as the alkyl group having 1 to 6 carbon atoms and forming $R^{11}$ to $R^{18}$, $Y^1$, and $Y^4$, for example, a methyl group, ethyl group, n-propyl group, isopropyl group, butyl group, pentyl group, hexyl group, cyclohexyl group, etc. may be mentioned. As the aryl group having 6 to 12 carbon atom, for example, a phenyl group, methylphenyl group, etc. may be mentioned. Among these as well, from the viewpoint of the ease of production of the polyorganosiloxane itself, methyl group and ethyl group are preferable.

In the polyorganosiloxane represented by the formula (4), as the functional group able to react with the active end of the polymer chain of the conjugated diene rubber and forming $Y^1$, $Y^2$, and $Y^4$, an alkoxy group having 1 to 5 carbon atoms, a hydrocarbon group containing a 2-pyrrolidonyl group, and a epoxy group-containing group having 4 to 12 carbon atoms are preferable, and a epoxy group-containing group having 4 to 12 carbon atoms is more preferable.

As the alkoxy group having 1 to 5 carbon atoms, for example, a methoxy group, ethoxy group, propoxy group, isopropoxy group, butoxy group, etc. may be mentioned. Among these as well, from the viewpoint of the reactivity with the active end of the polymer chain of the conjugated diene rubber, a methoxy group and ethoxy group are preferable.

As the hydrocarbon group containing a 2-pyrrolidonyl group, for example, one represented by the following formula (6) may be mentioned.

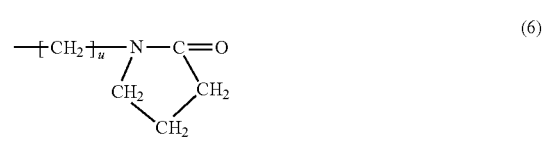

In the formula (6), "u" is an integer of 2 to 10, while 2 is preferable.

As the epoxy group-containing group having 4 to 12 carbon atoms, for example, one represented by the following formula (7) may be mentioned.

$$-Z^1-Z^2-E \qquad (7)$$

In formula (7), $Z^1$ is an alkylene group or an alkylarylene group having 1 to 10 carbon atoms, $Z^2$ is a methylene group, sulfur atom, or oxygen atom, and E is a substituted hydrocarbon group having an epoxy group with 2 to 10 carbon atoms. Among these as well, one where $Z^2$ is an oxygen atom is preferable, one where $Z^2$ is an oxygen atom and E is a glycidyl group is more preferable, and one where $Z^1$ is an alkylene group having 3 carbon atoms, $Z^2$ is an oxygen atom, and E is a glycidyl group is particularly preferable.

In the polyorganosiloxane represented by formula (4), the groups represented by $R^{11}$ to $R^{18}$ are preferably an alkyl group having 1 to 6 carbon atoms, as $Y^1$ and $Y^4$, among the above, an alkyl group having 1 to 6 carbon atoms is preferable, and as $Y^2$, among the above, a epoxy group-containing group having 4 to 12 carbon atoms is preferable.

In the polyorganosiloxane represented by the formula (4), as $Y^3$, that is, the group containing 2 to 20 alkylene glycol repeating units, for example, one represented by the following formula (8) may be mentioned.

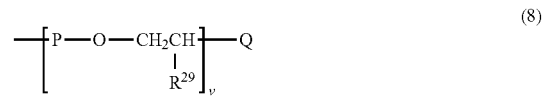

In the formula (8), "v" is an integer of 2 to 20, P is an alkylene group or alkylarylene group having 2 to 10 carbon atoms, and $R^{29}$ is a hydrogen atom or methyl group, where the plurality of $R^{29}$ may be the same or different. Q is an alkoxy group or aryloxy group having 1 to 10 carbon atoms. Among these as well, it is preferably one where "v" is an integer of 2 to 8, P is an alkylene group having 3 carbon atoms, $R^{29}$ is an hydrogen atom, and Q is a methoxy group.

In the polyorganosiloxane represented by formula (4), "p" is an integer of 3 to 200, preferably 3 to 150, more preferably 3 to 120. If the number of "p" is within the above range, the obtained cross-linked rubber can be further improved in low heat buildup.

In the polyorganosiloxane represented in the formula (4), "q" is an integer of 0 to 200, preferably 0 to 150, more preferably 0 to 120. "r" is an integer of 0 to 200, preferably 0 to 150, more preferably 0 to 120. The total number of "p", "q", and "r" is preferably 3 to 400, more preferably 3 to 300, particularly preferably 3 to 250. If the total number of "p", "q", and "r" is too great, the viscosity of the polymerization solution during the reaction becomes too high and production of the modified conjugated diene rubber is liable to become difficult.

Note that, in the polyorganosiloxane represented by formula (4), when the epoxy group in the polyorganosiloxane reacts with the active end of the polymer chain of the not yet modified conjugated diene rubber, it is considered that at least part of the epoxy groups in the polyorganosiloxane are opened, whereby bonds are formed between the carbon atoms of the part of the open epoxy groups and the atoms of the active ends of the polymer chains of the conjugated diene rubber. Further, when the alkoxy group in the polyorganosiloxane react with the active end of the polymer chain of the conjugated diene rubber, it is considered that at least part of the alkoxy groups in the polyorganosiloxane disassociate, whereby bonds are formed between the silicon atoms contained in the polyorganosiloxane and the atoms of the active ends of the polymer chains of the conjugated diene rubber. Further, when the 2-pyrrolidonyl group in the polyorganosiloxane react with the active end of the polymer chain of the conjugated diene rubber, it is considered that the carbon-oxygen bonds of the carbonyl groups forming at least part of the 2-pyrrolidonyl groups in the polyorganosiloxane are opened and bonds are formed between the carbon atoms and the atoms of the active ends of the polymer chains of the conjugated diene rubber.

In the hydrocarbyloxysilane compound represented by the formula (5), the alkyl group having 1 to 6 carbon atoms and the aryl group having 6 to 12 carbon atoms are similar to those explained for the polyorganosiloxane of formula (4).

In the hydrocarbyloxysilane compound represented by the formula (5), as the alkylene group having 1 to 12 carbon atoms, for example, a methylene group, ethylene group, and propylene group etc. may be mentioned. Among these as well, a propylene group is preferable.

As specific examples of the hydrocarbyloxysilane compound represented by the formula (5), N,N-bis(trimethylsilyl)-3-aminopropyltrimethoxysilane, N,N-bis(trimethylsilyl)-3-aminopropyltriethoxysilane, N,N-bis(trimethylsilyl)aminoethyltrimethoxysilane, N,N-bis(trimethylsilyl)aminoethyltriethoxysilane, etc. may be mentioned.

The amount of use of the silane compound is not particularly limited, but is preferably the amount such that the amount of the group having reactivity with the active end with respect to 1 mole of the active end of the conjugated diene rubber having an active end obtained at the above-mentioned second step becomes 0.05 to 5 moles in range, more preferably 0.1 to 3 moles in range, particularly preferably 0.3 to 1.5 moles. By making the amount of use of the silane compound the above range, it is possible to make the effect of addition a more remarkable one. Note that, the silane compound may be used as single types alone or may be used as two types or more combined.

The method of reacting the silane compound with the active end of the polymer chain of the conjugated diene rubber obtained at the second step explained above is not particularly limited, but the method of mixing the conjugated diene rubber having an active end and the silane compound in a solvent able to dissolve these may be mentioned. As the solvent used at this time, ones illustrated as the solvents used in the above-mentioned first step and second step etc. can be used. Further, at this time, the method of rendering the conjugated diene polymer having an active end obtained at the above-mentioned second step in a state as the polymerization solution used for polymerization and adding the silane compound to this is simple and preferable. Further, at this time, the silane compound is preferably dissolved in the inert solvent used for the polymerization explained above and added to the polymerization system. The solution concentration is preferably 1 to 50 wt % in range. The reaction temperature at the modification reaction is not particularly limited, but is usually 0 to 120° C. The reaction time is not particularly limited, but is usually 1 minute to 1 hour.

The timing of adding the silane compound to the solution containing the conjugated diene rubber having an active end obtained at the above-mentioned second step is not particularly limited, but the silane compound is preferably added to this solution in the state where the polymerization reaction has not been completed and the solution containing the conjugated diene polymer having an active end also contains the monomer, more specifically the state where the solution containing the conjugated diene polymer having an active end contains 100 ppm or more of monomer, more preferably 300 to 50,000 ppm of monomer. By adding the silane compound in this way, it becomes possible to suppress a secondary reaction between the conjugated diene polymer having an active end and the impurities contained in the polymerization system and control the reaction well.

Note that, before or after the third step (before or after causing the silane compound to react with the conjugated diene rubber obtained at the above-mentioned second step), preferably before the third step, it is possible to add a step of adding a coupling agent normally used since the past such as tin tetrachloride to the polymerization system to an extent not detracting from the effect of the present invention and coupling part of the polymer chains of the conjugated diene rubber having an active end. Further, before or after the third step (before or after causing the silane compound to react with the conjugated diene rubber obtained at the above-mentioned second step), it is possible to add a step of adding an end-modifying agent other than a silane compound normally used since the past such as N-methyl-ε-caprolactam to the polymerization system to an extent not detracting from the effect of the present invention and modifying part of the polymer chains of the conjugated diene rubber having an active end by other than the silane compound. Further, after the third step (after causing the silane compound to react with the conjugated diene rubber obtained at the above-mentioned second step), if polymer chain of the conjugated diene rubber having an active end remain in the polymerization system, it is preferable to add a polymerization terminator usually used in the past such as methanol into the polymerization system to deactivate the active end of the conjugated diene rubber having an active end.

Further, in the method of production of the present invention, after obtaining the conjugated diene rubber in the second step or, after obtaining the conjugated diene rubber modified by the silane compound in the third step when reacting it with the silane compound in the third step, a deprotection reaction may be performed at the polymer block of the compound represented by the formula (1) introduced at the above-mentioned first step to deprotect the group represented by "—SiR$^2$R$^3$R$^4$" in the formula (1) or the protecting group represented by X when X is a protecting group of the amino group. As the deprotection reaction, it is possible to use without restriction a method using a general acid such as hydrochloric acid or a base such as tetrabutylammonium fluoride. In particular, by performing such a deprotection reaction, it is possible to introduce an amino group to which at least one hydrogen atom is directly bonded into the polymer block of the compound represented by the formula (1) and thereby further raise the affinity with a filler such as silica. The reaction temperature of the deprotection reaction is not particularly limited, but is usually 0 to 120° C. The reaction time is not particularly limited, but is usually 5 minutes to 10 hours. Further, in the present invention, the deprotection reaction for removing the protecting group of the amino group may, for example, be performed by causing the deprotection reaction at the same time as kneading when kneading the obtained conjugated diene rubber with various types of compounding agents such as silica to obtain a rubber composition, which is later explained.

To the above obtained solution of the conjugated diene rubber, it is possible to add, as desired, an antioxidant such as a phenol-based stabilizer, phosphorus-based stabilizer, and sulfur-based stabilizer. The amount of the antioxidant added may be suitably determined in accordance with the type etc. Furthermore, if desired, an extension oil may also be blended in to make the conjugated diene rubber an oil-extended rubber. As the extension oil, for example, a petroleum-based softening agent such as paraffin-based, aromatic-based, and naphthalene-based, plant-based softening agent, and fatty acid, etc. may be mentioned. When using a petroleum-based softening agent, the content of polycyclic aromatic which is extracted by the method of IP346 (method of testing of the Institute Petroleum of the UK) is preferably less than 3%. When using the extension oil, the amount of use is usually 5 to 100 parts by weight with respect to 100 parts by weight of the modified conjugated diene rubber.

Further, the thus obtained conjugated diene rubber can be steam stripped etc. to remove the solvent and thereby separate it from the reaction mixture to obtain a solid form of the conjugated diene rubber.

The weight average molecule weight (Mw) of the conjugated diene rubber obtained by the method of production of the present invention is not particularly limited, but the value measured by gel permeation chromatography and converted to polystyrene is usually 100,000 to 3,000,000, preferably 120,000 to 2,000,000, more preferably 150,000 to 1,500,000 in range. By making the weight average molecular weight of the conjugated diene rubber the above range, mixing a filler such as silica in the conjugated diene rubber becomes easy and the rubber composition becomes more excellent in processability.

Further, the molecular weight distribution expressed by the ratio (Mw/Mn) of the weight average molecule weight (Mw) and number average molecular weight (Mn) of the conjugated diene rubber obtained by the method of production of the present invention is not particularly limited, but is preferably 1.0 to 5.0, particularly preferably 1.0 to 3.0. By making the molecular weight distribution of the conjugated diene rubber the above range, the obtained cross-linked rubber becomes more excellent in low heat buildup.

Further, the Mooney viscosity ($ML_{1+4}$, 100° C.) of the conjugated diene rubber obtained by the method of production of the present invention is not particularly limited, but is usually 20 to 200, preferably 30 to 150 in range. By making the Mooney viscosity of the conjugated diene rubber the above range and using this rubber to form the rubber composition, it is possible to obtain a rubber composition excellent in processability. Note that, when making the conjugated diene rubber an oil extended rubber, the Mooney viscosity of the oil extended rubber is preferably made the above range.

Further, the content of vinyl bonds in the conjugated diene unit part of the conjugated diene rubber obtained by the method of production of the present invention is usually 1 to 80 wt %, preferably 5 to 75 wt %. By making the amount of vinyl bonds the above range, the obtained cross-linked rubber becomes excellent in low heat buildup.

[Rubber Composition]

The rubber composition of the present invention is a composition containing 10 to 200 parts by weight of silica with respect to 100 parts by weight of the rubber ingredient containing the conjugated diene rubber obtained by the above-mentioned method of production of the present invention.

As the silica used in the present invention, for example, dry-process white carbon, wet-process white carbon, colloidal silica, precipitated silica, etc. may be mentioned. Among these, wet-process white carbon mainly comprising hydrous silicic acid is preferably used. Further, it is also possible to use a carbon-silica dual phase filler comprising carbon black on the surface of which silica is carried. These silica may be used either alone or as a combination of two or more thereof. The nitrogen adsorption specific surface area of the silica used (measured in accordance with ASTM D3037-81 by BET method) is preferably 50 to 300 $m^2/g$, more preferably 80 to 220 $m^2/g$, particularly preferably 100 to 170 $m^2/g$. Further, the pH of the silica is preferably 5 to 10.

In the rubber composition of the present invention, the amount of the silica is 10 to 200 parts by weight with respect to 100 parts by weight of the rubber ingredient in the rubber composition, preferably 30 to 150 parts by weight, more preferably 50 to 100 parts by weight. By making the amount of the silica the above range, the processability of the rubber composition becomes more excellent and the obtained cross-linked rubber becomes more excellent in low heat buildup.

The rubber composition of the present invention may further contain a silane coupling agent from the viewpoint of further improving the low heat buildup property. As the silane coupling agent, for example, vinyl triethoxysilane, β-(3,4-epoxycyclohexyl)ethyl trimethoxysilane, N-(β-aminoethyl)-γ-aminopropyl trimethoxysilane, 3-octathio-1-propyl-triethoxysilane, bis(3-(triethoxysilyl)propyl)disulfide, bis(3-(triethoxysilyl)propyl)tetrasulfide, γ-trimethoxysilylpropyldimethylthiocarbamyl tetrasulfide, γ-trimethoxysilylpropylbenzothiazyl tetrasulfide, etc. may be mentioned. These silane coupling agents may be used respectively alone or as two types or more combined. The amount of the silane coupling agent is preferably 0.1 to 30 parts by weight with respect to 100 parts by weight of silica, more preferably 1 to 15 parts by weight.

Further, the rubber composition of the present invention may further contain carbon black such as furnace black, acetylene black, thermal black, channel black, and graphite. Among these as well, furnace black is preferable. These carbon black may be used respectively alone or as two types or more combined. The amount of the carbon black is not particularly limited, but is usually 120 parts by weight or less with respect to 100 parts by weight of the rubber ingredient in the rubber composition.

Note that, the method of adding silica to the rubber ingredient including the conjugated diene rubber of the present invention is not particularly limited. The method of adding it and kneading it to a solid rubber ingredient (dry kneading method), the method of adding it to a solution containing the conjugated diene rubber then coagulation and drying the same (wet kneading method) etc. may be used.

Further, the rubber composition of the present invention preferably further contains a cross-linking agent. As the cross-linking agent, for example, a sulfur-containing compound such as sulfur and halogenated sulfur, an organic peroxide, a quinone dioxime, an organic polyvalent amine compound, and an alkyl phenol resin having a methylol group may be mentioned. Among these as well, sulfur is preferably used. The amount of the cross-linking agent is preferably 0.1 to 15 parts by weight with respect to 100 parts by weight of the rubber ingredient in the rubber composition, more preferably 0.5 to 5 parts by weight, particularly preferably 1 to 4 parts by weight.

Furthermore, the rubber composition of the present invention may contain, in addition to the above ingredients, in accordance with an ordinary method, a cross-linking accelerator, cross-linking activator, antioxidant, filler (excluding the above silica and carbon black), activator, process oil, plasticizer, lubricant, tackifier, or the compounding ingredient in the necessary amounts.

When using, as a cross-linking agent, sulfur or sulfur-containing compound, a cross-linking accelerator and a cross-linking activator are preferably jointly used. As the cross-linking accelerator, for example, a sulfenamide-based cross-linking accelerator; guanidine-based cross-linking accelerator; thiourea-based cross-linking accelerator; thiazole-based cross-linking accelerator; thiuram-based cross-linking accelerator; dithiocarbamic acid-based cross-linking accelerator; xantogenic acid-based cross-linking accelerator; etc. may be mentioned. Among these as well, one containing a sulfenamide-based cross-linking accelerator is preferable. These cross-linking accelerators may be used respectively alone or as two types or more combined. The amount of cross-linking accelerator is preferably 0.1 to 15 parts by weight with respect to 100 parts by weight of the rubber ingredient in the rubber composition, more preferably 0.5 to 5 parts by weight, particularly preferably 1 to 4 parts by weight.

As the cross-linking activator, for example, higher fatty acid such as stearic acid; zinc oxide; etc. may be mentioned. These cross-linking activators may be used respectively alone or as two types or more in combination. The amount of cross-linking activator is preferably 0.05 to 20 parts by weight with respect to 100 parts by weight of the rubber ingredient in the rubber composition, particularly preferably 0.5 to 15 parts by weight.

Further, the rubber composition of the present invention may contain other rubber besides the conjugated diene rubber obtained by the above-mentioned method of production of the present invention. As the other rubber, for example, natural rubber, polyisoprene rubber, emulsion polymerization styrene-butadiene copolymer rubber, solution polymerization styrene-butadiene copolymer rubber, polybutadiene rubber (either high cis-BR or low cis-BR. Further, may be polybutadiene rubber which contains crystal fibers comprising 1,2-polybutadiene polymer), styrene-isoprene copolymer rubber, butadiene-isoprene copolymer rubber, styrene-isoprene-butadiene copolymer rubber, acrylonitrile-butadiene copolymer rubber, acrylonitrile-styrene-butadiene copolymer rubber, etc. other than the above-mentioned conjugated diene rubber may be mentioned. Among these as well, natural rubber, polyisoprene rubber, polybutadiene rubber, and solution polymerization styrene-butadiene copolymer rubber are preferable. These rubbers can be used respectively alone or as two types or more combined.

In the rubber composition of the present invention, the conjugated diene rubber obtained by the method of production of the present invention preferably accounts for 10 to 100 wt % of the rubber ingredient in the rubber composition, particularly preferably accounts for 50 to 100 wt %. By including the conjugated diene rubber obtained by the method of production of the present invention in the rubber ingredient in such a ratio, it is possible to obtain a cross-linked rubber excellent in low heat buildup.

To obtain the polymer composition of the present invention, the components may be kneaded in accordance with an ordinary method. For example, the compounding ingredient other than the cross-linking agent, cross-linking accelerator or other ingredient which is unstable against heat and the conjugated diene rubber are kneaded, then the kneaded matter is mixed with the cross-linking agent, cross-linking accelerator or other ingredient which is unstable against heat to obtain the target composition. The kneading temperature of the compounding ingredient other than the ingredient which is unstable against heat and the conjugated diene rubber is preferably 80 to 200° C., more preferably 120 to 180° C. and the kneading time of that is preferably 30 seconds to 30 minutes. Further, the kneaded matter is mixed with the cross-linking agent and cross-linking accelerators after cooling usually down to 100° C. or less, preferably 80° C. or less.

[Cross-Linked Rubber]

The cross-linked rubber of the present invention is obtained by cross-linking the above-mentioned rubber composition of the present invention. The cross-linked rubber of the present invention can be produced by using the rubber composition of the present invention, for example, molding it by a molding machine which is designed for the desired shape, for example, an extruder, an injection molding machine, a press, a roll, etc., and heating it to cause a cross-linking reaction and fix the shape as a cross-linked product. In this case, it is possible to shape the composition in advance, then cross-link it or shape and cross-link it simultaneously. The molding temperature is usually 10 to 200° C., preferably 25 to 120° C. The cross-linking temperature is usually 100 to 200° C., preferably 130 to 190° C., while the cross-linking time is usually 1 minute to 24 hours, preferably 2 minutes to 12 hours, particularly preferably 3 minutes to 6 hours.

Further, depending on the shape, size, etc. of the cross-linked rubber, sometimes even if the surface is cross-linked, the inside may not be sufficiently cross-linked, so the cross-linked rubber may be further heated for secondary cross-linking.

As the heating method, press heating, steam heating, oven heating, hot air heating, and other general methods which are used for cross-linking of rubber may be suitable selected.

The thus obtained cross-linked rubber of the present invention is obtained using the conjugated diene rubber obtained by the above-mentioned method of production of the present invention, so is excellent in low heat buildup. In particular, the conjugated diene rubber obtained by the method of production of the present invention is provided with the polymer block of the compound represented by the formula (1) at the polymerization starting end side of the polymer chain, so is high in affinity with a filler such as silica. Further, the conjugated diene rubber modified by the silane compound is provided with the polymer block of the compound represented by the formula (1) at the polymerization starting end side of the polymer chain and is provided with the group modified by a modification reaction using a silane compound at the polymerization termination side end, so is further raised in affinity with a filler such as silica. In particular, in the method of production of the present invention, preferably the compound represented by the formula (1) is polymerized alone to introduce the compound represented by the formula (1) in the form of the polymer block to thereby enable the affinity with respect to a filler such as silica to be raised more efficiently. Therefore, the cross-linked rubber of the present invention obtained using this conjugated diene rubber obtained by such a method of production of the present invention is high in affinity between the conjugated diene rubber and the silica used as a filler and therefore is excellent low heat buildup.

Further, making use of such characteristics, the cross-linked rubber of the present invention can be used for example for various applications such as, in tires, the materials of various tire parts such as the cap tread, base tread, carcass, side walls, and beads; the materials of various industrial products such as hoses, belts, mats, and shock absorbing rubber; agents for improving the impact resistance of resins; resin film cushioning; shoe soles; rubber shoes; golf balls; and toys. In particular, the cross-linked rubber of the present invention is excellent in low heat buildup, so can be suitably used as a material of a tire, in particular a material of a fuel efficient tire, and is optimum for a tread application.

EXAMPLES

Below, the present invention will be explained based on more detailed examples, but the present invention is not limited to these examples. Note that, in the examples, "parts" are based on weight unless otherwise indicated. Further, the tests and evaluations were performed in accordance with the following descriptions.

[Molecular Weight of Rubber]

The molecular weight of the rubber was found by gel permeation chromatography as the molecular weight converted to polystyrene. The specific measurement conditions were as follows:

Measuring device: high performance liquid chromatograph (made by Toso, product name "HLC-8220")

Column: made by Toso, product name "GMH-HR-H", two connected in series.

Detector: differential refractometer ("RI-8220" made by Toso)

Eluent: tetrahydrofuran

Column temperature: 40° C.

[Microstructure of Rubber]

This was measured by $^1$H-NMR.

Measuring device: "JNM-ECA-400WB" made by JEOL

Measurement solvent: Deuterochloroform

[Processability]

The rubber composition used as a sample was measured for Mooney viscosity ($ML_{1+4}$, 100° C.) in accordance with JIS K6300 using a Mooney viscometer (made by Shimadzu Corporation). The lower this measurement value, the better the processability.

[Low Heat Buildup]

A length 50 mm, width 12.7 mm, and thickness 2 mm test piece (cross-linked rubber) was measured for tan δ at 60° C. under conditions of a dynamic strain of 2.5% and 10 Hz using a viscoelasticity measuring device ("ARES" made by Rheometrics). For Examples 1 to 3 and Comparative Examples 1 to 4, this characteristic was shown indexed to the measurement value of Comparative Example 1 as 100, while for Examples 4 to 6 and Comparative Examples 5 to 9, was shown indexed to the measurement value of Comparative Example 5 as 100. The lower this index, the better the low heat buildup.

[Wet Grip]

A length 50 mm, width 12.7 mm, and thickness 2 mm test piece (cross-linked rubber) was measured for tan δ at 0° C. under conditions of a dynamic strain of 0.5% and 10 Hz using a viscoelasticity measuring device ("ARES" made by Rheometrics). This characteristic was shown indexed to the measurement value of Comparative Example 1 as 100. The higher this index, the better the wet grip.

[Synthesis Example] Synthesis of p-[N,N-bis(dimethylphenylsilyl) amino]styrene p-[N,N-bis(dimethylphenylsilyl)amino]styrene (compound represented by the following formula (9)) was synthesized by the method described in "Macromol. Chem. Phys. 2000, 201, 2699-2704". The structure of the obtained p-[N,N-bis(dimethylphenylsilyl)amino]styrene was confirmed by $^1$H-NMR. $^1$H-NMR (500 MHz, CDCl$_3$, TMS, δ ppm): 7.44 (m, 4H), 7.34 (m, 4H), 7.30 (m, 2H), 7.19 (d, 2H, J=8.2 Hz), 6.84 (d, 2H, J=8.2 Hz), 6.64 (dd, 1H, J=18.2 Hz, 10.8 Hz), 5.64 (dd, 1H, J=18.2 Hz, 0.7 Hz), 5.15 (dd, 1H, J=10.8 Hz, 0.7 Hz), 0.2 (s, 12H).

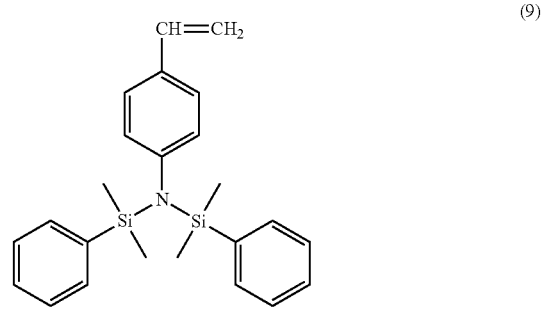 [SMILES: C=Cc1ccc(N([Si](C)(C)c2ccccc2)[Si](C)(C)c2ccccc2)cc1]

(9)

[Comparative Synthesis Example 1] Synthesis of (p-(dimethylamino)styrene p-(dimethylamino)styrene (compound represented by the following formula (10)) was synthesized based on the method described in "Polymer J. 1988, 20, 791-799". The structure of the obtained p-(dimethylamino) styrene was confirmed by $^1$H-NMR.

(10)

[Comparative Synthesis Example 2] Synthesis of (p-[N,N-bis(trimethylsilyl)amino]styrene p-[N,N-bis(trimethylsilyl)amino]styrene (compound represented by the following formula (11)) was synthesized based on the method described in "Macromol. Chem. Phys. 2000, 201, 2699-2704". The structure of the obtained p-[N, N-bis(trimethylsilyl)amino]styrene was confirmed by $^1$H-NMR.

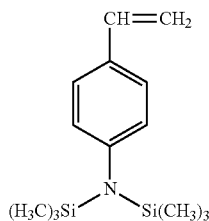

(11)

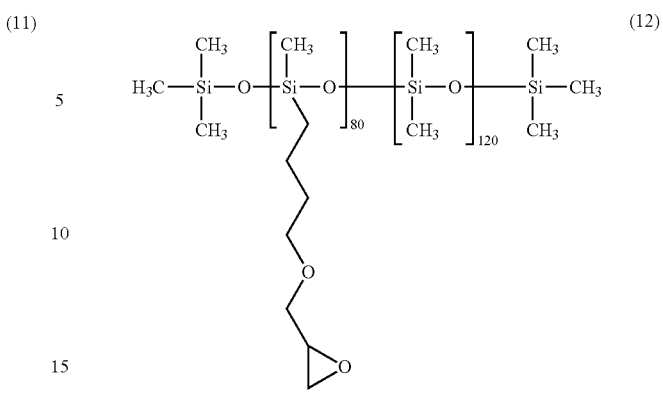

(12)

*Copolymerization type is random.
Number of recurring units is
average value.

[Example 1] Production of Styrene-Butadiene Copolymer Rubber 1, Rubber Composition Thereof, and Cross-Linked Rubber Thereof To a 100 ml ampoule vial with an inside substituted by nitrogen, 23.4 g of cyclohexane and 2.6 mmol of tetramethylethylenediamine were added. Furthermore, 0.6 g of the p-[N,N-bis(dimethylphenylsilyl)amino] styrene obtained in Synthesis Example was added. Next, 1.4 mmol of n-butyllithium was added while stirring and a reaction caused at room temperature for 60 minutes to thereby obtain a solution containing the polymer block 1A of p-[N,N-bis(dimethylphenylsilyl)amino]styrene (polymer comprised of polymer block of the p-[N,N-bis(dimethylphenylsilyl) amino]styrene at the end of which hydrocarbyllithium was introduced as an active end). A very small part of the obtained polymer block 1A was taken out, then methanol was added to this to deactivate the active end. This was used as a sample for measurement of the weight average molecule weight (Mw). The results are shown in Table 1.

Next, an autoclave was charged with 760 g of cyclohexane, 94.8 g of 1,3-butadiene, and 25.2 g of styrene in a nitrogen atmosphere, the entire amount of the solution containing the polymer block 1A of p-N,N-bis(dimethylphenylsilyl)amino]styrene obtained by the above operation was added, and the polymerization was started at 60° C. The polymerization reaction was continued for 60 minutes. After it was confirmed that the polymerization conversion rate reached 95 to 100% in range, 0.044 mmol of tin tetrachloride was added in the state of a 20 wt % concentration cyclohexane solution and a reaction performed for 10 minutes. Next, the polyorganosiloxane represented by the following formula (12) was added in the state of a 20 wt % concentration xylene solution such that an amount of epoxy group became an amount equivalent to 0.5 times the moles of the n-butyllithium which was used and a reaction was performed for 30 minutes. After that, a polymerization terminator comprised of methanol in an amount corresponding to 2 times the moles of the n-butyllithium which was used was added to obtain a solution containing the Styrene-Butadiene Copolymer Rubber 1.

Next, to the obtained solution containing the Styrene-Butadiene Copolymer Rubber 1, as an antioxidant, 0.2 part of "Irganox 1520L" (made by Ciba Specialty Chemicals) was added with respect to 100 parts of the Styrene-Butadiene Copolymer Rubber 1, then steam stripping was used to remove the solvent and the remainder was dried in vacuo at 60° C. for 24 hours to obtain a solid form of the Styrene-Butadiene Copolymer Rubber 1.

Further, the obtained Styrene-Butadiene Copolymer Rubber 1 was measured for weight average molecule weight (Mw), content of styrene units, content of vinyl bonds, and content of p-[N,N-bis(dimethylphenylsilyl)amino]styrene units (content of amino group-containing monomer units). The results are shown in Table 1.

Next, in a volume 250 ml Brabender type mixer, 100 parts of the Styrene-Butadiene Copolymer Rubber 1 obtained by the above operation were masticated for 30 seconds, then 50 parts of silica (made by Rhodia, "Zeosil 1165MP"), 25 parts of process oil (made by Japan Oil Corporation, "Aromax T-DAE"), and 6.4 parts of a silane coupling agent comprised of bis(3-(triethoxysilyl)propyl)tetrasulfide (made by Degussa, "Si69") were added. The mixture was kneaded at a starting temperature of 110° C. for 1.5 minutes, then 30 parts of silica (made by Rhodia, "Zeosil 1165MP"), 3.0 parts of zinc oxide, 2.0 parts of stearic acid, and 2.0 parts of an antioxidant comprised of N-phenyl-N'-(1,3-dimethylbutyl)-p-phenylenediamine (made by Ouchi Shinko Chemical Industrial, "Nocrac 6C") were added. The mixture was further kneaded for 2.5 minutes then the kneaded material was discharged from the mixer. The temperature of the kneaded material at the time of the end of kneading was 150° C. Next, the obtained kneaded material was cooled down to room temperature, then was again kneaded in a Brabender type mixer at a starting temperature of 110° C. for 2 minutes, then the kneaded material was discharged from the mixer. Next, an open roll mill was used at 50° C. to knead the obtained kneaded material with 1.7 parts of sulfur, a cross-linking accelerator (1.8 parts of N-cyclohexyl-2-benzothiazolylsulfenamide (made by Ouchi Shinko Chemical Industrial, "Noccelar CZ-G"), and 1.1 parts of diphenylguanidine (made by Ouchi Shinko Chemical Industrial, "Noccelar D")), then a sheet-shaped rubber composition was taken out. Further, the obtained rubber composition was cross-linked by pressing at 160° C. for 25 minutes to prepare cross-linked rubber (test piece). This test piece was used to evaluate the low heat buildup and wet grip. The results are shown in Table 1. Further, the obtained rubber composition was evaluated for processability (measured for Mooney viscosity ($ML_{1+4}$, 100° C.)), whereupon the Mooney viscosity ($ML_{1+4}$, 100° C.) was 85 and the processability was excellent.

Next, except for using the Styrene-Butadiene Copolymer Rubber 2 obtained in the above way instead of the Styrene-Butadiene Copolymer Rubber 1, the same procedure was followed as in Example 1 to prepare a rubber composition

TABLE 1

|  |  | Example 1 | Example 2 | Example 3 |
|---|---|---|---|---|
| Styrene-butadiene copolymer rubber | Amino group-containing monomer which is used | p-[N,N-bis(dimethylphenylsilyl)amino]styrene | p-[N,N-bis(dimethylphenylsilyl)amino]styrene | p-[N,N-bis(dimethylphenylsilyl)amino]styrene |
|  | Polymerization type of amino group-containing monomer units | Polymerization starting end block | Polymerization starting end block | Polymerization starting end block |
|  | Weight average molecule weight of polymer block at polymerization starting end side | 400 | 1900 | 3800 |
|  | Weight average molecule weight | 365,000 | 342,000 | 376,000 |
|  | Content of styrene units [wt %] | 21.3 | 22.0 | 22.1 |
|  | Content of vinyl bonds [wt %] | 60.1 | 60.7 | 59.5 |
|  | Content of amino group-containing monomer units [wt %] | 0.5 | 3.0 | 5.0 |
| Evaluation of cross-linked rubber | Low heat buildup (index) | 92 | 81 | 69 |
|  | Wet grip (index) | 107 | 113 | 116 |

|  |  | Comparative Example 1 | Comparative Example 2 | Comparative Example 3 | Comparative Example 4 |
|---|---|---|---|---|---|
| Styrene-butadiene copolymer rubber | Amino group-containing monomer which is used | p-[N,N-bis(dimethylphenylsilyl)amino]styrene | p-(dimethylamino)styrene | p-(dimethylamino)styrene | — |
|  | Polymerization type of amino group-containing monomer units | Random | Polymerization starting end block | Random | — |
|  | Weight average molecule weight of polymer block at polymerization starting end side | — | 1700 | — | — |
|  | Weight average molecule weight | 372,000 | 369,000 | 339,000 | 323,000 |
|  | Content of styrene units [wt %] | 20.8 | 21.4 | 21.3 | 21.1 |
|  | Content of vinyl bonds [wt %] | 59.3 | 59.1 | 59.8 | 60.2 |
|  | Content of amino group-containing monomer units [wt %] | 6.0 | 1.5 | 3.0 | — |
| Evaluation of cross-linked rubber | Low heat buildup (index) | 100 | 110 | 112 | 120 |
|  | Wet grip (index) | 100 | 97 | 93 | 90 |

[Example 2] Production of Styrene-Butadiene Copolymer Rubber 2, Rubber Composition Thereof, and Cross-Linked Rubber Thereof Except for changing the amount used of the p-[N,N-bis(dimethylphenylsilyl)amino]styrene obtained in the Synthesis Example from 0.6 g to 3.0 g, the same procedure was followed as in Example 1 to obtain a solution of the polymer block 2A of p-[N,N-bis(dimethylphenylsilyl)amino]styrene (polymer comprised of polymer block of p-[N,N-bis(dimethylphenyl-silyl)amino]styrene at the end of which hydrocarbyllithium is introduced as an active end). A very small part of the obtained polymer block 2A was taken out, then methanol was added to this to deactivate the active end. This was used as a sample for measurement of the weight average molecule weight (Mw). The results are shown in Table 1.

Further, except for using the solution containing the polymer block 2A obtained in the above way instead of the solution containing the polymer block 1A, the same procedure was followed as in Example 1 to obtain a solid form of the Styrene-Butadiene Copolymer Rubber 2 and measure the obtained Styrene-Butadiene Copolymer Rubber 2 for weight average molecule weight (Mw), content of styrene units, content of vinyl bonds, and content of p-[N,N-bis(dimethylphenylsilyl)amino]styrene units (content of amino group-containing monomer units). The results are shown in Table 1.

and cross-linked rubber (test piece) and evaluate the cross-linked rubber for low heat buildup and wet grip. The results are shown in Table 1. Further, the obtained rubber composition was evaluated for processability (measured for Mooney viscosity ($ML_{1+4}$, 100° C.)), whereby the Mooney viscosity ($ML_{1+4}$, 100° C.) was 90 and the processability was excellent.

[Example 3] Production of Styrene-Butadiene Copolymer Rubber 3, Rubber Composition Thereof, and Cross-Linked Rubber Thereof Except for changing the amount of use of the p-[N,N-bis(dimethylphenylsilyl)amino]styrene obtained in the Synthesis Example from 0.6 g to 6.0 g, the same procedure was followed as in Example 1 to obtain a solution of the polymer block 3A of p-[N,N-bis(dimethylphenylsilyl)amino]styrene (polymer comprised of polymer block of p-[N,N-bis(dimethylphenylsilyl)amino]styrene at the end of which hydrocarbyllithium is introduced as an active end). A very small part of the obtained polymer block 3A was taken out, then methanol was added to this to deactivate the active end and the weight average molecule weight (Mw) was measured. The results are shown in Table 1.

Further, except for using a solution containing the polymer block 3A obtained in the above way instead of the solution containing the polymer block 1A, the same procedure was followed as in Example 1 to obtain a solid form of the Styrene-Butadiene Copolymer Rubber 3 and measure the obtained Styrene-Butadiene Copolymer Rubber 3 for weight average molecule weight (Mw), content of styrene units, content of vinyl bonds, and content of p-[N,N-bis(dimethylphenylsilyl)amino]styrene units (content of amino group-containing monomer units). The results are shown in Table 1.

Next, except for using the Styrene-Butadiene Copolymer Rubber 3 obtained in the above way instead of the Styrene-Butadiene Copolymer Rubber 1, the same procedure was followed as in Example 1 to prepare a rubber composition and cross-linked rubber (test piece) and evaluate the cross-linked rubber for low heat buildup and wet grip. The results are shown in Table 1. Further, the obtained rubber composition was evaluated for processability (measured for Mooney viscosity ($ML_{1+4}$, 100° C.)), whereby the Mooney viscosity ($ML_{1+4}$, 100° C.) was 97 and the processability was excellent.

[Comparative Example 1] Production of Styrene-Butadiene Copolymer Rubber c1, Rubber Composition Thereof, and Cross-Linked Rubber Thereof An autoclave was charged with 760 g of cyclohexane, 2.6 mmol of tetramethylethylenediamine, 94.8 g of 1,3-butadiene, 25.2 g of styrene, and 6.5 g of the p-[N,N-bis(dimethylphenylsilyl)amino]styrene obtained by the Synthesis Example, then 0.8 mmol of n-butyllithium was added and the polymerization started at 60° C. The polymerization reaction was continued for 60 minutes. After it was confirmed that the polymerization conversion rate became 95 to 100% in range, 0.044 mmol of tin tetrachloride was added in the state of a 20% weight concentration cyclohexane solution and a reaction was performed for 10 minutes. Next, the polyorganosiloxane represented by the above formula (12) was added in the state of a 20% concentration xylene solution such that an amount of epoxy group became an amount equivalent to 0.5 times the moles of the n-butyllithium which was used and a reaction was performed for 30 minutes. After that, a polymerization terminator comprised of methanol in an amount corresponding to 2 times the moles of the n-butyllithium which was used was added to obtain a solution containing the Styrene-Butadiene Copolymer Rubber c1.

Next, to the obtained solution containing the Styrene-Butadiene Copolymer Rubber c1, as an antioxidant, 0.2 part of "Irganox 1520L" (made by Ciba Specialty Chemicals) was added with respect to 100 parts of the Styrene-Butadiene Copolymer Rubber c1, then the rubber was steam stripped to remove the solvent and the remainder was dried in vacuo at 60° C. for 24 hours to obtain a solid form of the Styrene-Butadiene Copolymer Rubber c1.

Further, the obtained Styrene-Butadiene Copolymer Rubber c1 was measured for weight average molecule weight (Mw), content of styrene units, content of vinyl bonds, and content of p-[N,N-bis(dimethylphenylsilyl)amino]styrene units (content of amino group-containing monomer units). The results are shown in Table 1.

Next, except for using the Styrene-Butadiene Copolymer Rubber c1 obtained in the above way instead of the Styrene-Butadiene Copolymer Rubber 1, the same procedure was followed as in Example 1 to prepare a rubber composition and cross-linked rubber (test piece) and evaluate the cross-linked rubber for low heat buildup and wet grip. The results are shown in Table 1.

[Comparative Example 2] Production of Styrene-Butadiene Copolymer Rubber c2, Rubber Composition Thereof, and Cross-Linked Rubber Thereof Except for using 1.8 g of the p-(dimethylamino)styrene obtained in Comparative Synthesis Example 1 instead of the p-[N,N-bis(dimethylphenylsilyl)amino]styrene obtained in the Synthesis Example, the same procedure was followed as in Example 2 to obtain polymer block c2A of p-(dimethylamino)styrene (polymer comprised of polymer block of p-(dimethylamino)styrene at the end of which hydrocarbyllithium is introduced as an active end). A very small part of the obtained polymer block c2A was taken out, then methanol was added to this to deactivate the active end. This was used as a sample for measurement of the weight average molecule weight (Mw). The results are shown in Table 1.

Further, except for using the polymer block c2A obtained in the above way instead of the polymer block 1A, the same procedure was followed as in Example 1 to obtain a solid form of the Styrene-Butadiene Copolymer Rubber c2 and measure the obtained Styrene-Butadiene Copolymer Rubber c2 for weight average molecule weight (Mw), content of styrene units, content of vinyl bonds, and content of p-(dimethylamino)styrene units (content of amino group-containing monomer units). The results are shown in Table 1.

Next, except for using the Styrene-Butadiene Copolymer Rubber c2 obtained in the above way instead of the Styrene-Butadiene Copolymer Rubber 1, the same procedure was followed as in Example 1 to prepare a rubber composition and cross-linked rubber (test piece) and evaluate the cross-linked rubber for low heat buildup and wet grip. The results are shown in Table 1.

[Comparative Example 3] Production of Styrene-Butadiene Copolymer Rubber c3, Rubber Composition Thereof, and Cross-Linked Rubber Thereof Except for using 3.0 g of the p-(dimethylamino)styrene obtained in Comparative Synthesis Example 1 instead of the p-[N,N-bis(dimethylphenylsilyl)amino]styrene obtained in Synthesis Example, the same procedure was followed as in Comparative Example 1 to obtain a solid form of the Styrene-Butadiene Copolymer Rubber c3 and measure the obtained Styrene-Butadiene Copolymer Rubber c3 for weight average molecule weight (Mw), content of styrene units, content of vinyl bonds, and content of p-(dimethylamino)styrene units (content of amino group-containing monomer units). The results are shown in Table 1.

Next, except for using the Styrene-Butadiene Copolymer Rubber c3 obtained in the above way instead of the Styrene-Butadiene Copolymer Rubber 1, the same procedure was followed as in Example 1 to prepare a rubber composition and cross-linked rubber (test piece) and evaluate the cross-linked rubber for low heat buildup and wet grip. The results are shown in Table 1.

[Comparative Example 4] Production of Styrene-Butadiene Copolymer Rubber c4, Rubber Composition Thereof, and Cross-Linked Rubber Thereof Except for not using the p-[N,N-bis(dimethylphenylsilyl) amino]styrene obtained in Synthesis Example, the same procedure was followed as in Comparative Example 1 to obtain a solid form of the Styrene-Butadiene Copolymer Rubber c4 and measure the obtained Styrene-Butadiene Copolymer Rubber c4 for weight average molecule weight (Mw), content of styrene units, and content of vinyl bonds. The results are shown in Table 1.

Next, except for using the Styrene-Butadiene Copolymer Rubber c4 obtained in the above way instead of the Styrene-Butadiene Copolymer Rubber 1, the same procedure was followed as in Example 1 to prepare a rubber composition and cross-linked rubber (test piece) and evaluate the cross-linked rubber for low heat buildup and wet grip. The results are shown in Table 1.

From Table 1, it can be said that cross-linked rubber obtained using the conjugated diene rubber (styrene-butadiene copolymer rubber) produced by the method of production of the present invention is excellent in low heat buildup and further is excellent in wet grip (Examples 1 to 3). Further, as explained above, the rubber compositions obtained using the conjugated diene rubber (styrene-butadiene copolymer rubber) produced by the method of production of the present invention was excellent in processability in each case.

On the other hand, the cross-linked rubber obtained using the conjugated diene rubber obtained by copolymerization of the compound represented by the formula (1) together with styrene and butadiene by a random type without going through the first step in the present invention (styrene-butadiene copolymer rubber) can be said to be inferior in low heat buildup (Comparative Example 1). Furthermore, it can be said that cross-linked rubber obtained using a conjugated diene rubber (styrene-butadiene copolymer rubber) produced using an amino group-containing compound different from the compound represented by the formula (1) or a conjugated diene rubber (styrene-butadiene copolymer rubber) produced without using a compound containing an amino group is also inferior in low heat buildup (Comparative Examples 2 to 4).

[Example 4] Production of Butadiene Rubber 4, Rubber Composition Thereof, and Cross-Linked Rubber Thereof Except for changing the amount of use of tetramethylethylene-diamine from 2.6 mmol to 0.14 mmol, the same procedure was followed as in Example 1 to obtain a solution containing polymer block 4A of the p-[N,N-bis(dimethylphenylsilyl)amino]styrene (polymer comprised of polymer block of p-[N,N-bis(dimethylphenylsilyl)amino]styrene at the end of which hydrocarbyllithium is introduced as an active end). A very small part of the obtained polymer block 4A was taken out, then methanol was added to this to deactivate the active end. This was used as a sample for measurement of the weight average molecule weight (Mw). The results are shown in Table 2.

Next, an autoclave was charged with 760 g of cyclohexane and 120 g of 1,3-butadiene in a nitrogen atmosphere, then the entire amount of the solution containing the polymer block 4A of the p-[N,N-bis(dimethylphenylsilyl)amino] styrene obtained by above operation was added and the polymerization started at 60° C. The polymerization reaction was continued for 60 minutes. After it was confirmed that the polymerization conversion rate became 95 to 100% in range, 0.044 mmol of tin tetrachloride was added in the state of a 20% weight concentration cyclohexane solution and a reaction was performed for 10 minutes. Next, the polyorganosiloxane represented by the above formula (12) was added in the state of a 20% concentration xylene solution such that an amount of epoxy group became an amount equivalent to 0.5 times the moles of the n-butyllithium used which was used and a reaction was performed for 30 minutes. After that, a polymerization terminator comprised of methanol in an amount corresponding to 2 times the moles of the n-butyllithium which was used was added to obtain a solution containing the Butadiene Rubber 4.

Next, to the obtained solution containing the Butadiene Rubber 4, as an antioxidant, 0.2 part of "Irganox 1520L" (made by Ciba Specialty Chemicals) was added with respect to 100 parts of the Butadiene Rubber 4, then steam stripping was used to remove the solvent and the remainder was dried in vacuo at 60° C. for 24 hours to obtain a solid form of the Butadiene Rubber 4.

Further, the obtained Butadiene Rubber 4 was measured for weight average molecule weight (Mw), content of vinyl bonds, and content of p-[N,N-bis(dimethylphenylsilyl) amino]styrene units (content of amino group-containing monomer units). The results are shown in Table 2.

Next, except for using the Butadiene Rubber 4 obtained in the above way instead of the Styrene-Butadiene Copolymer Rubber 1, the same procedure was followed as in Example 1 to prepare a rubber composition and cross-linked rubber (test piece) and to evaluate the obtained rubber composition for processability (measure the Mooney viscosity ($ML_{1+4}$, 100° C.)) and, further, evaluate the obtained cross-linked rubber for low heat buildup. The results are shown in Table 2.

TABLE 2

|  |  | Example 4 | Example 5 | Example 6 | Comparative Example 5 |
|---|---|---|---|---|---|
| Butadiene rubber | Amino group-containing monomer which is used | p-[N,N-bis(dimethylphenylsilyl)amino]styrene | p-[N,N-bis(dimethylphenylsilyl)amino]styrene | p-[N,N-bis(dimethylphenylsilyl)amino]styrene | p-[N,N-bis(dimethylphenylsilyl)amino]styrene |
|  | Polymerization type of amino group-containing monomer units | Polymerization starting end block | Polymerization starting end block | Polymerization starting end block | Random |
|  | Weight average molecule weight of polymer block at polymerization starting end side | 400 | 1900 | 3900 | — |
|  | Weight average molecule weight | 401,000 | 421,000 | 428,000 | 360,000 |
|  | Content of vinyl bonds [wt %] | 24.6 | 23.6 | 21.0 | 22.0 |
|  | Content of amino group-containing monomer units [wt %] | 0.5 | 2.9 | 5.0 | 4.1 |
| Evaluation of cross-linked rubber | Low heat buildup (index) | 96 | 75 | 67 | 100 |
|  | Processability ($ML_{1+4}$, 100° C.) | 86 | 89 | 92 | 72 |

TABLE 2-continued

| | | Comparative Example 6 | Comparative Example 7 | Comparative Example 8 | Comparative Example 9 |
|---|---|---|---|---|---|
| Butadiene rubber | Amino group-containing monomer which is used | p-[N,N-bis(trimethyl-silyl)amino]styrene | p-[N,N-bis(trimethyl-silyl)amino]styrene | p-[N,N-bis(trimethyl-silyl)amino]styrene | — |
| | Polymerization type of amino group-containing monomer units | Polymerization starting end block | Polymerization starting end block | Polymerization starting end block | — |
| | Weight average molecule weight of polymer block at polymerization starting end side | 300 | 1400 | 2800 | — |
| | Weight average molecule weight | 419,000 | 421,000 | 431,000 | 323,000 |
| | Content of vinyl bonds [wt %] | 22.6 | 23.9 | 21.3 | 21.7 |
| | Content of amino group-containing monomer units [wt %] | 0.3 | 1.7 | 3.3 | — |
| Evaluation of cross-linked rubber | Low heat buildup (index) | 95 | 78 | 71 | 122 |
| | Processability ($ML_{1+4}$, 100° C.) | 96 | 102 | 115 | 61 |

[Example 5] Production of Butadiene Rubber 5, Rubber Composition Thereof, and Cross-Linked Rubber Thereof Except for changing the amount of use of tetramethylethylenediamine from 2.6 mmol to 0.14 mmol, the same procedure was followed as in Example 2 to obtain a solution containing the polymer block 5A of p-[N,N-bis(dimethylphenylsilyl)amino]styrene (polymer comprised of polymer block of p-[N,N-bis(dimethylphenylsilyl)amino]styrene at the end of which hydrocarbyllithium is introduced as an active end). A very small part of the obtained polymer block 5A was taken out, then methanol was added to this to deactivate the active end. This was used as a sample to measure the weight average molecule weight (Mw). The results are shown in Table 2.

Further, except for using the solution containing the polymer block 5A obtained in the above way instead of the solution containing the polymer block 4A, the same procedure was followed as in Example 4 to obtain a solid form of the Butadiene Rubber 5 and measure the obtained Butadiene Rubber 5 for weight average molecule weight (Mw), content of vinyl bonds, and content of p-[N,N-bis(dimethylphenylsilyl) amino]styrene units (content of amino group-containing monomer units). The results are shown in Table 2.

Next, except for using the obtained Butadiene Rubber 5 obtained in the above way instead of the Butadiene Rubber 4, the same procedure was followed as in Example 4 to prepare a rubber composition and cross-linked rubber (test piece) and to evaluate the obtained rubber composition for processability (measure the Mooney viscosity ($ML_{1+4}$, 100° C.)) and, further, evaluate the obtained cross-linked rubber for low heat buildup. The results are shown in Table 2.

[Example 6] Production of Butadiene Rubber 6, Rubber Composition Thereof, and Cross-Linked Rubber Thereof Except for changing the amount of use of tetramethylethylenediamine from 2.6 mmol to 0.14 mmol, the same procedure was followed as in Example 3 to obtain a solution containing polymer block 6A of p-[N,N-bis(dimethylphenylsilyl)amino]styrene (polymer comprised of polymer block of p-[N,N-bis(dimethylphenylsilyl)amino]styrene at the end of which hydrocarbyllithium is introduced as am active end). A very small part of the obtained polymer block 6A was taken out, then methanol was added to this to deactivate the active end. This was used as a sample to measure the weight average molecule weight (Mw). The results are shown in Table 2.

Further, except for using a solution containing the obtained polymer block 6A obtained in the above way instead of the solution containing the polymer block 4A, the same procedure was followed as in Example 4 to obtain a solid form of the Butadiene Rubber 6 and to measure the obtained Butadiene Rubber 6 for weight average molecule weight (Mw), content of vinyl bonds, and content of p-[N,N-bis(dimethylphenylsilyl)amino]styrene units (content of amino group-containing monomer units). The results are shown in Table 2.

Next, except for using the Butadiene Rubber 6 obtained in the above way instead of the Butadiene Rubber 4, the same procedure was followed as in Example 4 to prepare a rubber composition and cross-linked rubber (test piece) and evaluate the obtained rubber composition for processability (measure the Mooney viscosity ($ML_{1+4}$, 100° C.)) and, further, evaluate the obtained cross-linked rubber for low heat buildup. The results are shown in Table 2.

[Comparative Example 5] Production of Butadiene Rubber c5, Rubber Composition Thereof, and Cross-Linked Rubber Thereof An autoclave was charged with 760 g of cyclohexane, 0.14 mmol of tetramethylethylenediamine, 120 g of 1,3-butadiene, and 5.0 g of the p-[N,N-bis(dimethylphenylsilyl)amino]styrene obtained by the Synthesis Example in a nitrogen atmosphere, then 0.8 mmol of n-butyllithium was added to start the polymerization at 60° C. The polymerization reaction was continued for 60 minutes. After it was confirmed that the polymerization conversion rate reached 95 to 100% in range, 0.044 mol of tin tetrachloride was added in the state of a 20 wt % concentration cyclohexane solution and reacted for 10 minutes. Next, the polyorganosiloxane represented by the above formula (12) was added in the state of a 20% concentration xylene solution such that an amount of epoxy group became an amount equivalent to 0.5 time the moles of the n-butyllithium which was used and a reaction was performed for 30 minutes. After that, a polymerization terminator comprised of methanol in an amount corresponding to 2 times the moles of the n-butyllithium which was used was added to obtain a solution containing the Butadiene Rubber c5.

Next, to the obtained solution containing the Butadiene Rubber c5, as an antioxidant, 0.2 part of "Irganox 1520L"

(made by Ciba Specialty Chemicals) was added to 100 parts of the Butadiene Rubber c5, then this was steam stripped to remove the solvent and the remainder was dried in vacuo at 60° C. for 24 hours to obtain a solid form of the Butadiene Rubber c5.

Further, the obtained Butadiene Rubber c5 was measured for weight average molecule weight (Mw), content of vinyl bonds, and content of p-[N,N-bis(dimethylphenylsilyl) amino]styrene units (content of amino group-containing monomer units). The results are shown in Table 2.

Next, except for using the Butadiene Rubber c5 obtained in the above way instead of the Butadiene Rubber 4, the same procedure was followed as in Example 4 to prepare a rubber composition and cross-linked rubber (test piece) and to evaluate the obtained rubber composition for processability (measure the Mooney viscosity ($ML_{1+4}$, 100° C.)) and, further, evaluate the obtained cross-linked rubber for low heat buildup. The results are shown in Table 2.

[Comparative Example 6] Production of Butadiene Rubber c6, Rubber Composition Thereof, and Cross-Linked Rubber Thereof Except for using, instead of the p-[N,N-bis(dimethylphenylsilyl) amino]styrene obtained at Synthesis Example, 0.4 g of the p-[N,N-bis(trimethylsilyl)amino]styrene obtained at Comparative Synthesis Example 2, the same procedure was followed as in Example 4 to obtain a solution containing polymer block c6A of p-[N,N-bis(trimethylsilyl)amino]styrene (polymer comprised of polymer block of p-[N,N-bis(trimethylsilyl)amino]styrene at the end of which hydrocarbyllithium is introduced as an active end). A very small part of the obtained polymer block c6A was taken out, then methanol was added to this to deactivate the active end. This was used as a sample to measure the weight average molecule weight (Mw). The results are shown in Table 2.

Further, except for using a solution containing the polymer block c6A obtained in the above way instead of a solution containing the polymer block 4A, the same procedure was followed as in Example 4 to obtain a solid form of the Butadiene Rubber c6 and measure the obtained Butadiene Rubber c6 for weight average molecule weight (Mw), content of vinyl bonds, and content of p-[N,N-bis(trimethylsilyl)amino]styrene units (content of amino group-containing monomer units). The results are shown in Table 2.

Next, except for using the Butadiene Rubber c6 obtained in the above way instead of the Butadiene Rubber 4, the same procedure was followed as in Example 4 to prepare a rubber composition and cross-linked rubber (test piece) and to evaluate the obtained rubber composition for processability (measure the Mooney viscosity ($ML_{1+4}$, 100° C.)) and, further, evaluate the obtained cross-linked rubber for low heat buildup. The results are shown in Table 2.

[Comparative Example 7] Production of Butadiene Rubber c7, Rubber Composition Thereof, and Cross-Linked Rubber Thereof Except for changing the amount of use of the p-[N,N-bis(trimethylsilyl)amino]styrene obtained at Comparative Synthesis Example 2 from 0.4 g to 2.0 g, the same procedure was followed as in Comparative Example 6 to obtain a solution containing the polymer block c7A of p-[N,N-bis(trimethylsilyl)amino]styrene (polymer comprised of polymer block of p-[N,N-bis(trimethylsilyl)amino]styrene at the end of which hydrocarbyllithium is introduced as an active end). A very small part of the obtained polymer block c7A was taken out, then methanol was added to this to deactivate the active end. This was used as a sample to measure the weight average molecule weight (Mw). The results are shown in Table 2.

Further, except for using the solution containing the polymer block c7A obtained in the above way instead of the solution containing the polymer block 5A, the same procedure was followed as in Example 5 to obtain a solid form of the Butadiene Rubber c7 and measure the obtained Butadiene Rubber c7 for weight average molecule weight (Mw), content of vinyl bonds, and content of p-[N,N-bis(trimethylsilyl)amino] styrene units (content of amino group-containing monomer units). The results are shown in Table 2.

Next, except for using the Butadiene Rubber c7 obtained in the above way instead of the Butadiene Rubber 4, the same procedure was followed as in Example 4 to prepare a rubber composition and cross-linked rubber (test piece) and to evaluate the obtained rubber composition for processability (measure the Mooney viscosity ($ML_{1+4}$, 100° C.)) and, further, evaluate the obtained cross-linked rubber for low heat buildup.

[Comparative Example 8] Production of Butadiene Rubber c8, Rubber Composition Thereof, and Cross-Linked Rubber Thereof Except for changing the amount of use of the p-[N,N-bis(trimethylsilyl)amino]styrene obtained at Comparative Synthesis Example 2 from 0.4 g to 3.9 g, the same procedure was followed as in Comparative Example 6 to obtain a solution containing polymer block c8A of p-[N,N-bis(trimethylsilyl)amino]styrene (polymer comprised of polymer block of p-[N,N-bis(trimethylsilyl)amino]styrene at the end of which hydrocarbyllithium is introduced as an active end). A very small part of the obtained polymer block c8A was taken out, then methanol was added to this to deactivate the active end. This was used as a sample to measure the weight average molecule weight (Mw). The results are shown in Table 2.

Further, except for using the solution containing the polymer block c8A obtained in the above way instead of the solution containing the polymer block 6A, the same procedure was followed as in Example 6 to obtain a solid form of the Butadiene Rubber c8 and measure the obtained Butadiene Rubber c8 for weight average molecule weight (Mw), content of vinyl bonds, and p-[N,N-bis(trimethylsilyl) amino]styrene units (content of amino group-containing monomer units). The results are shown in Table 2.

Next, except for using the Butadiene Rubber c8 obtained in the above way instead of the Butadiene Rubber 4, the same procedure was followed as in Example 4 to prepare a rubber composition and cross-linked rubber (test piece) and evaluate the obtained rubber composition for processability (measure the Mooney viscosity ($ML_{1+4}$, 100° C.)) and, further, evaluate the obtained cross-linked rubber for low heat buildup. The results are shown in Table 2.

[Comparative Example 9] Production of Butadiene Rubber c9, Rubber Composition Thereof, and Cross-Linked Rubber Thereof Except for not using the p-[N,N-bis(dimethylphenylsilyl) amino]styrene obtained in the Synthesis Example, the same procedure was followed as in Comparative Example 5 to obtain a solid form of the Butadiene Rubber c9 and measure the obtained Butadiene Rubber c9 for weight average molecule weight (Mw) and content of vinyl bonds. The results are shown in Table 2.

Next, except for using the Butadiene Rubber c9 obtained in the above way instead of the Butadiene Rubber 4, the same procedure was followed as in Example 4 to prepare a rubber composition and cross-linked rubber (test piece) and evaluate the obtained rubber composition for processability (measure the Mooney viscosity ($ML_{1+4}$, 100° C.)) and, further, evaluate the obtained cross-linked rubber for low heat buildup. The results are shown in Table 2.

From Table 2, it can be said that the rubber composition obtained by using the conjugated diene rubber (butadiene rubber) produced by the method of production of the present invention is excellent in processability and, further, that the cross-linked rubber obtained using this is excellent in low heat buildup (Examples 4 to 6). On the other hand, it can be said that the cross-linked rubber obtained by using the conjugated diene rubber (butadiene rubber) obtained by copolymerization of the compound represented by the formula (1) together with butadiene by a random type without going through the first step in the present invention is somewhat inferior in low heat buildup (Comparative Example 5). Furthermore, it can be said that a conjugated diene rubber (butadiene rubber) produced using the compound having amino group protected by trimethylsilyl group which does not have cyclic hydrocarbon group unlike the compound represented by the formula (1) is inferior in processability (Comparative Examples 6 to 8). Further, it can be said that a conjugated diene rubber (butadiene rubber) produced without using a compound containing amino group is excellent in processability, but the cross-linked rubber obtained using it is extremely inferior in low heat buildup (Comparative Example 9).

The invention claimed is:

1. A method of production of a conjugated diene rubber comprising:
    a first step comprising polymerizing a compound represented by a following formula (1) by using a polymerization initiator to obtain a polymer block of the compound represented by the formula (1) having an active end, and
    a second step comprising polymerizing at least a monomer containing a conjugated diene compound by using the active end of the polymer block,
    wherein:
        the weight average molecular weight (Mw) of the polymer block is 400 to 60,000;
        the weight average molecular weight (Mw) of the conjugated diene rubber obtained at the second step is 100,000 to 1,000,000; and

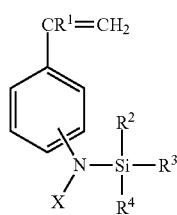

(1)

in the formula (1), $R^1$ is a hydrogen atom or a hydrocarbon group having 1 to 20 carbon atoms, $R^2$ is a hydrocarbon group having 3 to 20 carbon atoms and containing a ring structure, each of $R^3$ and $R^4$ independently is a hydrogen atom or a hydrocarbon group having 1 to 20 carbon atoms which is substituted or unsubstituted, and X is arbitrary monovalent group.

2. The method of production of a conjugated diene rubber according to claim h wherein the compound represented by the formula (1) is a compound represented by a following formula (1'):

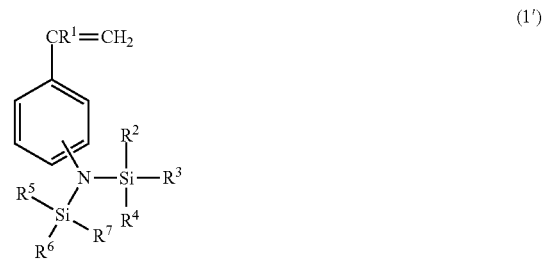

(1')

wherein, in the formula (1'), $R^1$ to $R^4$ are the same as those in formula (1), $R^5$ is a hydrocarbon group having 3 to 20 carbon atoms and containing a ring structure, and each of $R^6$ and $R^7$ independently is a hydrogen atom or a hydrocarbon group having 1 to 20 carbon atoms which is substituted or unsubstituted.

3. The method of production of a conjugated diene rubber according to claim 2, wherein the $R^2$ and $R^5$ are an aryl group-containing hydrocarbon group having 6 to 20 carbon atoms.

4. The method of production of a conjugated diene rubber according to claim h further comprising:
    a third step of reacting an active end of a polymer chain obtained in the second step with a silane compound having a functional group able to react at the active end.

5. The method of production of a conjugated diene rubber according to claim 1, wherein the second step comprises copolymerizing the monomer containing a conjugated diene compound and a monomer containing an aromatic vinyl compound to produce a polymer chain,
    wherein an amount of the monomer containing an aromatic vinyl compound in the polymer chain is 50 wt % or less of the polymer chain.

6. A conjugated diene rubber obtained by the method of production according to claim 1.

7. A rubber composition comprising:
    100 parts by weight of rubber ingredients containing the conjugated diene rubber according to claim 6; and
    10 to 200 parts by weight of silica.

8. The rubber composition according to claim 7, further comprising:
    a cross-linking agent.

9. A cross-linked rubber obtained by cross-linking the rubber composition according to claim 8.

10. A tire including the cross-linked rubber according to claim 9.

* * * * *